US011338900B2

(12) United States Patent
Curry et al.

(10) Patent No.: US 11,338,900 B2
(45) Date of Patent: May 24, 2022

(54) AIRCRAFT PLUG DOOR WITH IN-PLANE LOAD TRANSFER CAPACITY AND METHODS OF USE

(71) Applicants: James M. Curry, Snohomish, WA (US); Randolph Schemkes, Snohomish, WA (US)

(72) Inventors: James M. Curry, Snohomish, WA (US); Randolph Schemkes, Snohomish, WA (US)

( * ) Notice: Subject to any disclaimer, the term of this patent is extended or adjusted under 35 U.S.C. 154(b) by 498 days.

(21) Appl. No.: 15/932,777

(22) Filed: Apr. 23, 2018

(65) Prior Publication Data

US 2018/0304982 A1    Oct. 25, 2018

Related U.S. Application Data

(60) Provisional application No. 62/602,403, filed on Apr. 21, 2017.

(51) Int. Cl.
*B64C 1/14* (2006.01)
(52) U.S. Cl.
CPC ............ *B64C 1/143* (2013.01); *B64C 1/1415* (2013.01); *B64C 1/1461* (2013.01)
(58) Field of Classification Search
CPC ..... B64C 1/1407; B64C 1/1415; B64C 1/143; B64C 1/1461
See application file for complete search history.

(56) References Cited

U.S. PATENT DOCUMENTS

| 3,085,297 | A | | 4/1963 | Linderfelt |
| 3,585,757 | A | | 6/1971 | Ritchie |
| 3,718,171 | A | | 2/1973 | Godwin |
| 4,395,000 | A | | 7/1983 | Deviny |
| 4,473,201 | A | | 9/1984 | Barnes |
| 4,497,462 | A | * | 2/1985 | Hamatani ............ B64C 1/1415 |
| | | | | 244/129.5 |
| 5,823,473 | A | | 10/1998 | Odell |
| 2011/0121135 | A1 | | 5/2011 | Maguire |

OTHER PUBLICATIONS

Rusanu, Irina Written Opinion re: International Patent Application PCT/US2018/000107 (ISA/237) Written Opinion of the International Searching Authority dated Oct. 25, 2018 WIPO.
Written Opinion Rusanu, Irina dated Oct. 25, 2018 International Searching Authority.
Informal Response to Written Opinion Harold H. Bennett II dated May 28, 2019 Bellingham, WA.

* cited by examiner

*Primary Examiner* — Nicholas McFall
(74) *Attorney, Agent, or Firm* — Michael R. Schacht; Schacht Law Office, Inc.

(57) ABSTRACT

A plug door assembly for a pressurized aircraft is provided. The door assembly includes a surround and a door, and connector assemblies along the edges that act to transfer in-plane stresses directly across the fuselage opening via the door, as well as stops that react radial loads generated by cabin pressure. The door assembly obviates the need for a separate frame to transmit stresses around the perimeter of the fuselage opening.

29 Claims, 16 Drawing Sheets

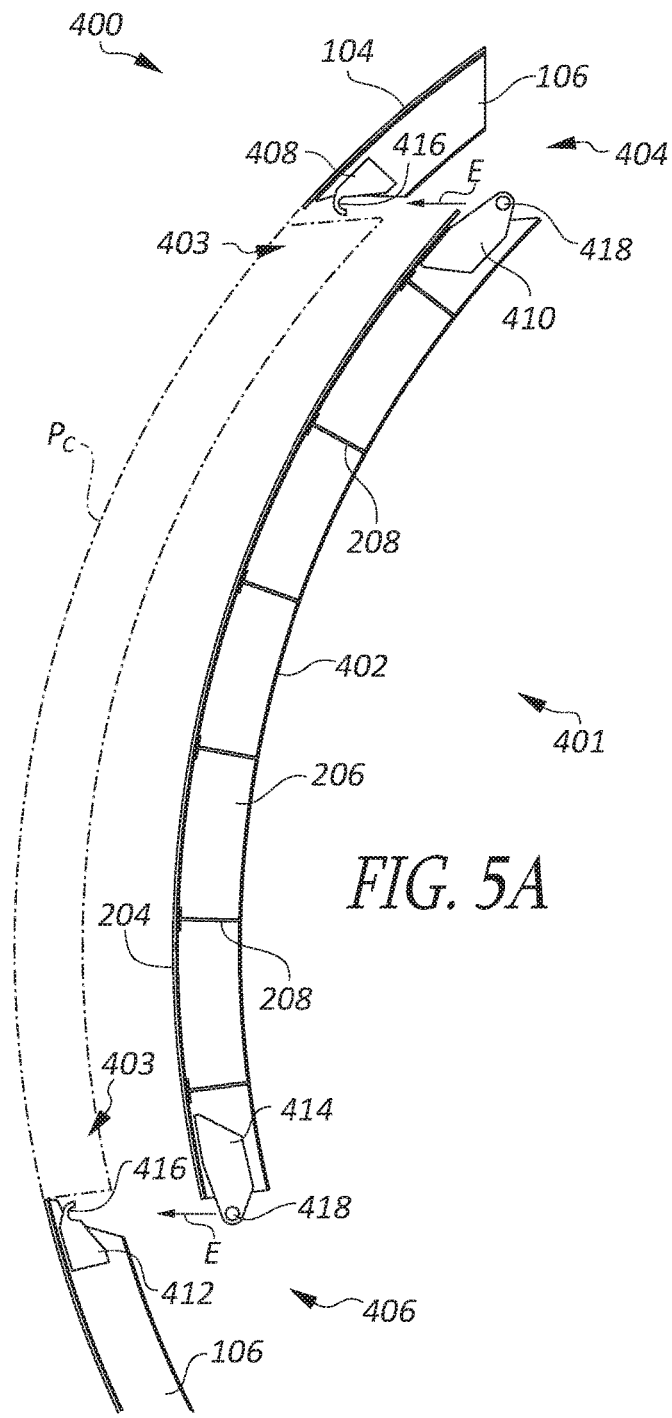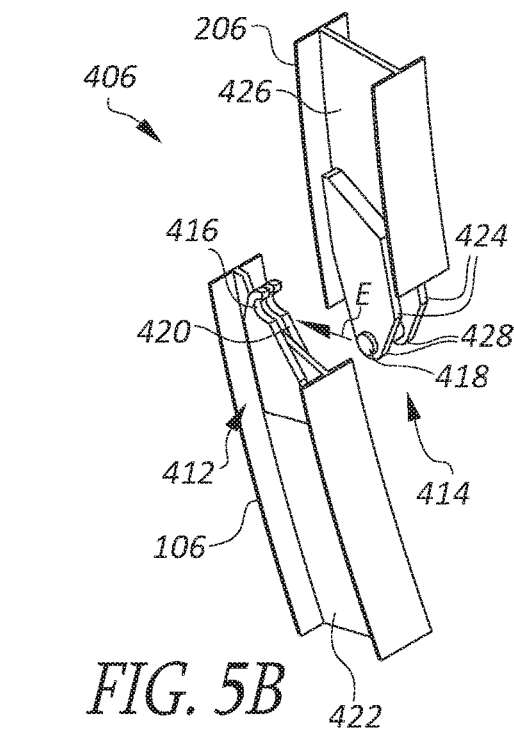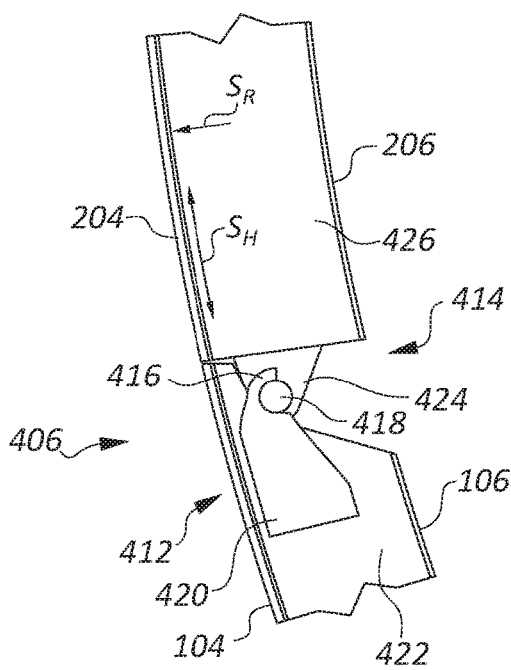
FIG. 5A
FIG. 5B
FIG. 5C

AIRCRAFT PLUG DOOR WITH IN-PLANE LOAD TRANSFER CAPACITY AND METHODS OF USE

RELATED CASES

This application claims the benefit of U.S. Provisional Patent Application Ser. No. 62/602,403, filed Apr. 21, 2017.

BACKGROUND

Technical Field

This disclosure relates generally to the field of closures for pressurized aircraft, and in particular to such closures capable of receiving and transferring in-plane stresses to and from the surrounding airframe.

Description of the Related Art

FIG. 1 is a diagrammatic side elevation view of a portion of a passenger aircraft fuselage 100, including a door opening 101 configured for ingress and egress of passengers. A door frame 102, or surround, extends around the door opening 101, and a door 103—not shown here in detail—is positioned in the door frame and configured to provide an airtight seal, permitting pressurization of the fuselage 100. The fuselage 100 comprises an outer skin 104—rendered transparent in the drawings—attached to and supported by a plurality of ribs 106 extending circumferentially around the fuselage, and a plurality of stringers 108 extending, parallel to a longitudinal axis of the fuselage, between adjacent pairs of ribs.

Structural members of an airframe, including those referred to here as ribs and stringers, are referred to in the industry by many different terms, including, e.g., bulkheads, frames, frame assemblies, formers, rings, longerons, intercostals, braces, gussets, web members, etc. For the purposes of the present disclosure and claims, the term rib, or rib member refers broadly to structural members extending substantially perpendicular to the longitudinal axis of an aircraft, and the term stringer refers broadly to members extending substantially parallel to the longitudinal axis of an aircraft. Structural members recited in the claims are not limited to a specific orientation, relative to an aircraft in which the members are, or are configured to be emplaced, except where such members are explicitly defined in a claim as ribs or stringers, or otherwise further defined.

Typically, airplane passenger doors are configured as plug doors. A plug door includes features that are designed such that when the door is closed, internal pressure cannot produce a force that will tend to open the door. Thus, from the closed position, the door cannot be moved directly outward to open the door. Instead, the door is required to move inward to open (although most plug doors are designed to open outward, after an initial inward movement). Because internal air pressure will tend to push outward, working against inward movement of the door, even a small pressure differential will hold the door tightly in the closed position, substantially eliminating the possibility of the door being inadvertently or intentionally opened while the plane is in the air.

FIGS. 2A-2C show some elements of a typical plug door assembly 200. FIG. 2A is a cross-sectional view of the door assembly 200, including the door 103 of FIG. 1, taken along lines 2-2, while FIG. 2B is an enlarged detail of the view of FIG. 2A, at the location marked 2B, showing a door stop assembly 202 with the door 103 in a latched configuration. FIG. 2C shows essentially the same view as FIG. 2B, with the door 103 in an unlatched configuration. The door 103 includes structural members corresponding to those described with reference to the fuselage 100, above, including a skin 204, frames 206, and stringers 208. Skin 204 constitutes the principal surface of the door, against which pressure differentials act to create radial loads. A door frame 102 extends around the door opening 101 in which the door 103 is positioned, and an elastomeric pressure seal 212 is arranged between the door and the door frame, configured to provide an airtight seal when the airplane is pressurized. The door assembly 200 also includes a plurality of door stop assemblies 202 mounted along the vertical edges of the door 103, each including a fixed door stop 214 rigidly coupled to the door, and a fixed frame stop 216 rigidly coupled to the door frame 102 in a position that corresponds to the door stop 214. In the example shown, an adjustment element 218 is provided to permit adjustment of the depth at which the door stop 214 contacts the frame stop 216.

With the door 103 in the latched configuration, as shown in FIG. 2B, each of the door stops 214 makes contact with the corresponding one of the frame stops 216. When the airplane takes off, the outside pressure drops almost immediately, as the plane climbs, so that the inward force $F_I$ applied to the door decreases. Meanwhile, the inside pressure in the airplane is maintained at a value that is greater than the outside pressure, exerting a significant outward force $F_O$ to the door 103, strongly biasing the door stops 214 against the frame stops 216. The pressure differential also pushes the elastomeric pressure seal 212 into a gap between the door frame 102 and the door 103, sealing the gap and preventing significant air loss from the aircraft at high altitudes. In this condition, outward force $F_O$ applied to the door 103 is sufficient to prevent movement of the door relative to the door frame 102, which is a safety feature of plug-type doors.

Turning now to FIG. 2C, when the airplane is on the ground and the pressure across the door 103 has been equalized, the inward and outward forces $F_I$, $F_O$ are equal, cancelling each other. In this condition, an operator can unlatch the door 103 and move the door inward slightly, so that the contact surfaces of the door stops 214 separate from the contact surfaces of the frame stops 216, creating a gap, at G. The operator, in this example, then moves the door 103 vertically until the door stops 214 are no longer aligned with the frame stops 216, at which point the door swings outward and back against the fuselage 100, on a complex hinge arrangement.

FIG. 3 is a diagrammatical end view of a portion of an airplane fuselage 300 with a door 302 and door frame 304 configured for use in loading and unloading cargo. The door 302 is of a type that is commonly referred to as a canopy door. Canopy doors are frequently used on cargo planes. A hinge assembly 306 at the upper edge supports the door 302 so that it can be opened upward from the fuselage 300, permitting unobstructed access to the cargo space inside. A latch mechanism 308 at the bottom edge of the door 302 and frame 304 is designed to secure the door during flight.

Details of the door 302 and associated mechanisms are provided in U.S. Pat. No. 4,473,201, which is incorporated herein by reference, in its entirety.

SUMMARY OF THE INVENTION

According to an embodiment, an airplane door assembly is provided, including a door configured to operate in a pressurized environment and form an airtight seal with a surrounding door opening. The door assembly includes a plurality of engagement assemblies distributed along each of the opposite sides of the door, the engagement assemblies being configured to transfer in-plane stress between the door and structural members of an airplane fuselage. The stresses are transferred through the door rather than around the opening, thus obviating the need for extra structural framing about the opening. The door assembly may comprise a plurality of connection elements located proximate ends of stringers and frames of the fuselage about the edges of the door opening, so that the stresses are transferred via the door from the ends of the stringers and frames on one side of the opening to the ends of the stringers and frames on the opposite side of the opening. The door may comprise a plurality of elongate stress-bearing members that extend generally horizontally and vertically across the door to transfer the in-plane stresses directly across the opening. The connection elements may couple ends of the elongate stress-bearing members of the door to the ends of the stringers and frames about the edges of the fuselage opening.

The connection elements may comprise hook-and-pin connectors that join the ends of the frames to the door and pin-and-socket connectors that join the ends of the stringers to the door.

These and other feature and advantages of the invention will be more fully appreciated from a reading of the following description with reference to the accompanying drawings.

BRIEF DESCRIPTION OF THE DRAWINGS

FIG. 2A is a cross-sectional view of the door of FIG. 1, taken along lines 2-2;

FIG. 2B is an enlarged detail of the view of FIG. 2A, at the location marked 2B, showing a door stop assembly with the door in a latched configuration;

FIG. 2C shows essentially the same view as FIG. 2B, with the door in an unlatched configuration;

FIGS. 5A-5C show aspects and features of an airplane fuselage, according to an embodiment;

FIG. 5A is a diagrammatical end view of a portion of the airplane fuselage with a plug door assembly configured to transfer stress in at least one in-plane axis, according to an embodiment;

FIG. 5B is an enlarged perspective view of one of a plurality of lower engagement assemblies of the plug door assembly of FIG. 5A, according to an embodiment;

FIG. 5C is an end view of the lower engagement assembly of FIG. 5B, showing the relationship of elements of the lower engagement assembly while the door is in the closed position;

DETAILED DESCRIPTION

Figure 1:
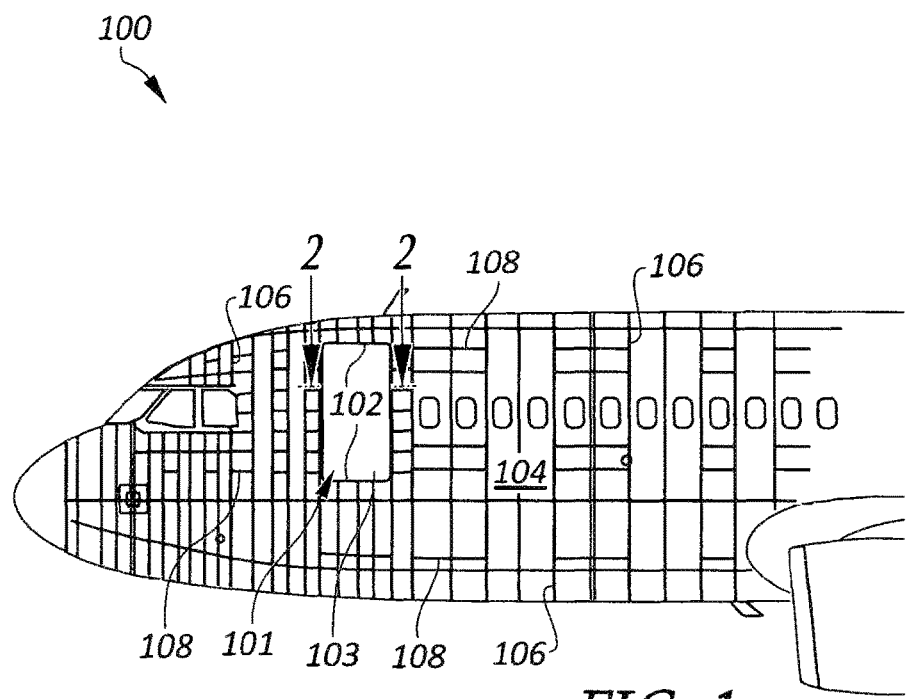
FIG. 1 is a diagrammatic side elevation view of a portion of a passenger aircraft fuselage, including a door configured for ingress and egress of passengers, according to known art.

In the following detailed description, reference is made to the accompanying drawings, which form a part hereof. In the drawings, similar symbols typically identify similar components, unless context dictates otherwise. Other embodiments may be used and/or other changes may be made without departing from the spirit or scope of the disclosure.

FIG. 1 is a diagrammatic side elevation view of a front portion of a passenger aircraft fuselage 100, including a door opening 101, door frame 102 and door 103, configured for entrance and exit of passengers.

Figure 4:
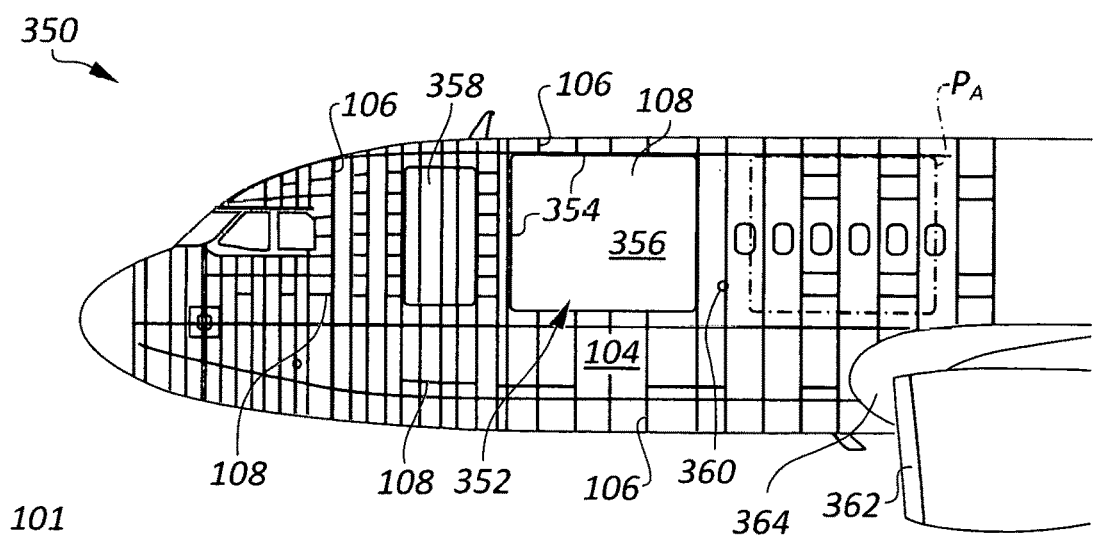
FIG. 4 is a diagrammatic side elevation view of a portion of a cargo aircraft fuselage, including a door configured for loading and unloading of cargo.

It is a fairly common occurrence for an airplane such as that shown in FIG. 1 to be retired from passenger service and converted for use as a cargo carrier. In such cases, the typical approach has been to deactivate the passenger door, since it is usually too narrow to handle ingress/egress of palletized and/or containerized cargo, and then install a larger cargo door somewhere else in the fuselage. However, the latter step is a substantial undertaking, involving not just cutting a new fuselage opening, but also engineering and constructing a large frame to carry fuselage stresses around the opening, with the result that such conversions are not only very expensive, but also tend to add undesirable weight and significantly delay return to service. As is illustrated in FIG. 4 and as will be described below, the present invention provides an improvement that enables such large-size openings and doors to be constructed and installed without need for structures and systems that are responsible for much of the cost, weight and delay experienced with conventional conversions. Furthermore, the benefits of the invention pertain regardless of whether the enlarged openings are for cargo handling or for other purposes, such as for improving passenger ingress/egress, for example.

In this context, a notable advantage of plug doors is the passive failsafe aspect they provide, i.e., the door and frame stops, or analogous elements, do not rely on any moving parts or latch mechanisms that must remain engaged for the door to remain securely closed. The airplane cabin cannot be pressurized until the door is properly positioned, and once the door is in position and the cabin pressurized, the door will remain secure with a very high degree of confidence. A failure of the latch mechanism during flight will have no effect on the security of the door, while the large number of door stop assemblies provides redundancy so that even if several were to fail simultaneously, the door would remain securely closed.

In contrast, a canopy door, as described with reference to FIG. 3, relies on a mechanical latch mechanism to hold it closed against the force exerted by a pressurized cabin, and, sometimes, against the impact of shifting cargo containers. While canopy doors are not generally used in passenger compartments, so there is less danger that an unauthorized individual might inadvertently or intentionally try to open such a door, canopy-type doors have nevertheless been known to fly open during flight, because of latch failure, or a latch that was not properly engaged before takeoff. Consequently, canopy doors and other doors that open outwardly require extensive precautionary measures and fail-safe mechanisms to prevent inadvertent opening during flight, adding significantly to the cost, complexity and weight of the installation. For example, current airworthiness standards in the United States require that doors "for which the initial opening movement is not inward" must have individual locks for each latch and located adjacent thereto, visual indicators at each operators station, means on the flight deck to signal the pilots if the door is not fully closed, latched, and locked, and so on (14 CFR 25.783); by contrast, due to their intrinsic safety, inwardly opening plug doors are largely exempt from such requirements (see, e.g., 14 CFR 25.783(d)(7), (h)). Still, despite these drawbacks, canopy doors can provide certain advantages over plug doors that make them attractive for use where large doors are required, one reason in particular being that the hinge and latching mechanisms of a canopy door can be configured to transfer stress to the door frame, whereas plug doors are not generally configured to transfer in-plane stress. A second advantage to canopy doors is that the doors do not occupy interior space in the airplane while open. In a cargo plane, if a door is configured to open inward, space must be kept clear to permit the door to open. This, of course, is space that cannot be occupied with cargo, which reduces the available carrying capacity.

During flight, an aircraft fuselage is subjected to stresses caused by several factors. A principal factor for fuselage stress is cabin pressurization, which exerts a load that produces longitudinal tension, hoop stress (circumferential tension), and radial tension. The radial tension is exerted normal to the outer skin of the plane, while the longitudinal and circumferential tension vectors are in plane with the skin—analysis of these forces can be simplified to a two-dimensional model, in which the cylindrical fuselage is treated as a planar body, thus, the forces are described as being in plane, even though the skin is curved.

The stress that arises as a result of pressurization of a cylinder is directly related to the diameter of the cylinder and the pressure differential. The circumferential stress is twice the longitudinal stress, so that, in an airplane fuselage, the top and bottom of a door frame experience twice the load per inch as the vertical sides. Comparing FIGS. 1 and 4, it can be seen that the cargo door illustrated in FIG. 4 is only slightly taller than the passenger door of FIG. 1, but more than twice as wide. The increase in longitudinal stress will therefore be minimal, while the increase in hoop stress to the door and/or door frame more than doubles. Accordingly, if the cargo door 356 of FIG. 4 does not transfer stress circumferentially, the door frame 354 must be reinforced to a much greater degree than in the case of a narrower passenger door, which increases the material costs and weight of the door frame. In the case of a conversion, where a passenger airplane is retrofit to carry cargo, providing the necessary reinforcement can significantly add to the cost, complexity, and time required to return the airplane to service. For all of these reasons, canopy-type doors are generally preferred for use in cargo planes, and particularly in conversion models.

Figure 2A:
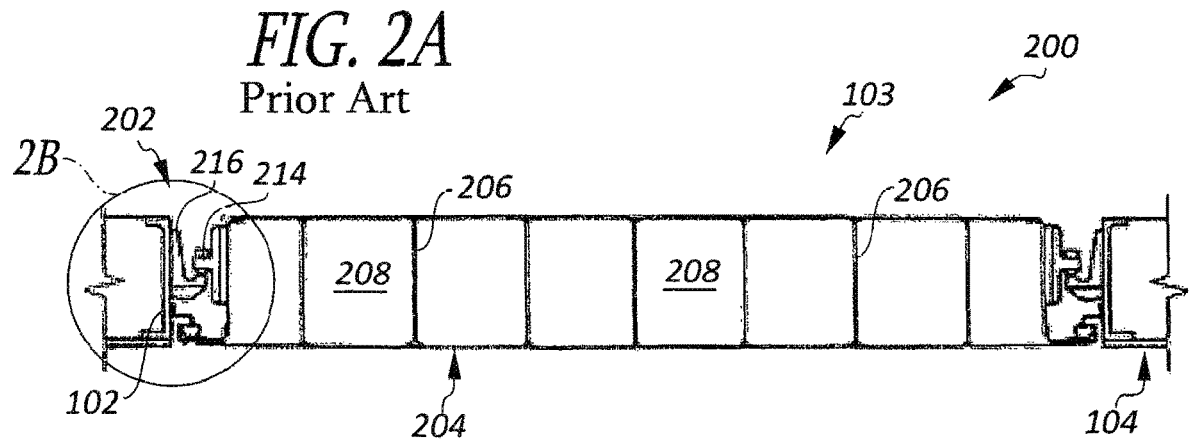
FIGS. 2A-2C show some elements of a typical plug door according to known art.
Figure 2B:
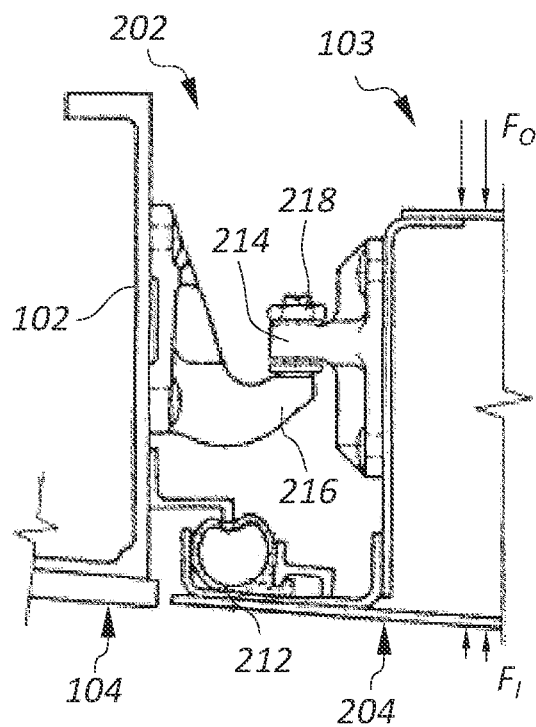
Figure 2C:
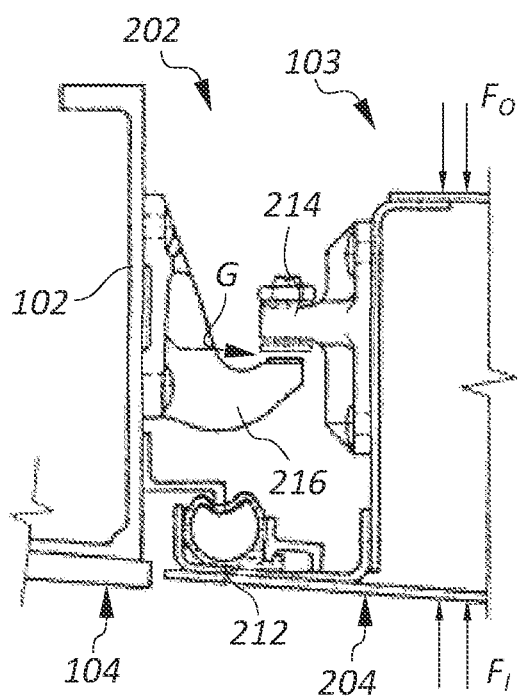

The term stress transfer is used herein to refer to a coupling function in which stress is transmitted between adjacent elements of a structure by operation of a coupling mechanism between the elements. In particular, in-plane stress transfer between an airplane door and airframe refers to the transmission of load stress between the door and airframe at opposite edges of the door, e.g., both the top and bottom edges, and/or both the left and right edges, so that the in-plane stress is transferred across the door, and not concentrated at the door frame. For example, referring to the cargo door 302 described with reference to FIG. 3, in-plane hoop stress produced by pressurization of the fuselage 300 during flight is transferred by the hinge and latch mechanisms 306, 308 so that the door 302 behaves as an integral part of the fuselage, insofar as the reaction of the fuselage to a circumferential component of the stress is concerned. This can be contrasted with a door assembly that is not configured to transfer in-plane stress, in which case a door frame is required to have sufficient stiffness as to withstand the in-plane stress without an unacceptable degree of flex or strain deformation. The door stop assemblies described above with reference to FIGS. 2A-2C are configured to transfer a stress component that is applied normal to the skin of the fuselage, but do not transfer in-plane stress, which is instead carried by the door frame.

FIG. 4 is a diagrammatic side elevation view of a portion of a fuselage 350, according to an embodiment, of an airplane that has been converted from passenger to cargo service. The fuselage 350 includes a plug door 352 configured for loading and unloading of cargo, a door frame 354 extending around the door opening, a door skin 356, and a patch 358 over the opening of the original passenger door. This location is generally considered optimal for most efficient loading and unloading of an airplane. While it might be preferred to place the door further forward over the footprint of the original passenger door, the taper in the fuselage 350 would require a slightly shorter door at that location, which would limit the maximum loading height and prevent the door from accommodating standard air cargo pallet containers. Such a configuration would likely be economically unviable for most air cargo service.

Figure 3:
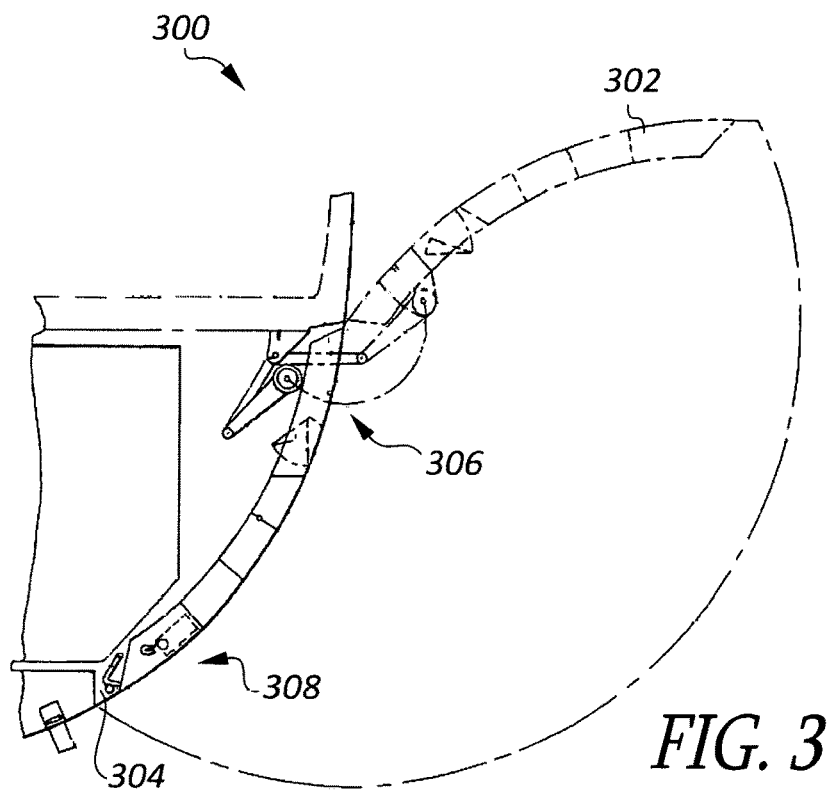
FIG. 3 is a diagrammatical end view of a portion of an airplane fuselage with a door configured for use in loading and unloading cargo, according to known art.

In the embodiment of FIG. 4, the door 352 and door frame 354 are configured to cooperate to transfer stress between the door and the frame in at least one in-plane axis. Additionally, according to an embodiment, the door 352 is also configured to transfer radial loads to the fuselage 350 in the longitudinal axis. This affords some significant benefits, particularly as more modern passenger airplanes are retired into cargo service:

One common characteristic of typical canopy doors is that the door latches at the bottom, as shown, for example, in FIG. 3, and as a result, the door will bulge outward slightly when pressurized, because of the radial forces exerted by the greater internal pressure. The vertical edges of the door are pushed outward slightly, into the airstream flowing across the skin, producing air turbulence and eddies downstream of the leading and trailing edges of the door. While this increases drag and therefore affects the fuel efficiency of the airplane, the overall effect has been considered negligible.

However, with newer airplanes, another problem arises. Many modern airplanes are completely fly-by-wire, with control systems that are integrated. The pilot indicates desired heading, altitude, speed, and so forth, whereupon onboard computers, which are constantly monitoring not only pilot instructions, but also internal systems, flight sensors, GPS data, etc., determine precisely how to set the control surfaces of the airplane, in view of the available data, so as to bring the airplane into conformance with the pilot's current instructions. It will be understood that the software programs required to safely and efficiently perform this complex task are themselves very complex. Because such control programs are responsible for the safety of the airplane and all of its passengers, they are subject to a great deal of scrutiny, and are subjected to rigorous certification trials before being approved for use in commercial airplanes.

Turning again to FIG. 4, an angle-of-attack (AOA) sensor 360 is shown, which is only one of a large number of sensors that provide in-flight data to the system that controls the airplane. This sensor location is used on at least one commercial jetliner model in common use. Other models use a similar sensor mounted further forward, over where the door 352 is located. If the cargo door 352 were to produce the kind of air disturbances that are typical of most canopy doors, the operation of the AOA sensor 360 would be compromised, and the control system would be decertified. When a passenger airplane of this type is converted to cargo service, the operator therefore has two options: First, the sensor 360 can be moved away from the air turbulence caused by the new cargo door. However, such a change would necessitate the modification of the control software so as to properly interpret the data from a new location on the airplane. This in turn would require the recertification of the modified software, which would likely require months or years, and would be prohibitively expensive for the typical operator.

The second option is to put the door somewhere else, such as, for example, downstream from the sensor. In FIG. 4, an alternate position $P_A$ is shown in phantom lines, which is frequently used by air cargo operators as an alternative to the position of the door 352 shown in FIG. 4. Unfortunately, while the alternative position $P_A$ is generally considered the best alternative, it creates its own problems. It will be recognized, first, that creating a larger opening in the fuselage 350 will tend to weaken the structure, so additional reinforcement is required, to retain structural rigidity. However, moving the door further aft means that the weight of the fuselage forward of the door is greater than it would be with the door in the other location. Thus, the required reinforcement is also greater, which adds weight and cost to the conversion. Second, with the door moved to the alternative position $P_A$, a cargo loader must work directly alongside the engine 362, and reach across the wing root 364 to load and unload cargo. The operator of the loader must therefore be very careful to avoid damaging the engine 362 or wing root 364. Additionally, because the loader must cantilever the load across a greater distance, there is a danger of overbalancing the loader, particularly if the load is very heavy. Even setting aside the cost of occasional repairs to the engine or wing, the added time required to load and unload more carefully and across a wider gap increases operating costs and reduces profits.

According to an embodiment, the door 352 is configured to transfer radial stress, at least in the longitudinal axis, to the fuselage forward and aft of the door. This prevents the bulge described above. Accordingly, the door 352 does not introduce turbulence into the airstream such as would interfere with the operation of the AOA sensor 360. Furthermore, according to an embodiment, in the case of airplane models that mount a sensor at the door's position, the sensor is mounted directly on the door.

FIGS. 5A-5C show aspects and features of an airplane fuselage 400, according to an embodiment. FIG. 5A is a diagrammatical end view of a portion of the airplane fuselage 400 with a plug door assembly 401 configured to transfer stress in at least one in-plane axis. The plug door assembly 401 comprises a door 402 configured to be positioned in a door opening 403, and includes a plurality of upper engagement assemblies 404 and a plurality of lower engagement assemblies 406, distributed, respectively, across the top and bottom of the door assembly between the door and the door opening. FIG. 5A shows one each of the pluralities of upper and lower hook-and-pin engagement assemblies 404, 406, which are configured to securely couple the door 402 to the fuselage 400, and to transfer stress between the door and the fuselage. The upper engagement assembly 404 includes an upper frame connecting element 408 rigidly coupled, above the door opening 403, to a rib 106 of the fuselage 400, and an upper door connecting element 410 rigidly coupled to a rib 206 of the door 402.

Similarly, the lower engagement assembly 406 includes a lower rib connecting element 412 rigidly coupled, below the door opening 403, to a rib 106 of the fuselage 400, and a lower door connecting element 414 rigidly coupled to a rib 206 of the door. The upper and lower rib connecting elements 408, 412 include respective engagement hooks 416, while the upper and lower door connecting elements 410, 414 include respective engagement pins 418. From the position shown in FIG. 5A, the door 402 is moved in an engagement direction E toward the door opening 403. When the door 402 is moved into the closed position $P_C$—shown in phantom lines in FIG. 5A—the engagement hooks 412 are configured to receive the engagement pins 418.

FIGS. 5B and 5C are enlarged views of one of the plurality of lower engagement assemblies 406 of the plug door assembly 401, and are representative, in general structure and operation, of the pluralities of upper and lower engagement assemblies 404, 406. FIG. 5B is a perspective view of the lower engagement assembly 406 with the door 402 in the partially open position shown in FIG. 5A. In the illustrated embodiment, the lower rib connecting element 412 includes a pair of rib connectors 420 rigidly coupled to a rib 106 of the fuselage 400 on opposite sides of a web 422 of the rib. Likewise, the lower door connecting element 414 includes a pair of door connectors 424 rigidly coupled to a rib 206 of the door 402 on opposite sides of a web 426 of that rib. Ends 428 of the door connectors 424 are spaced apart a distance sufficient to admit therebetween the engagement hook 416 formed by the rib connectors 420, and include apertures configured to receive the engagement pin 418 extending between them.

The rib connectors 420 and door connectors 424 can be coupled to the respective ribs 106, 206 by any means capable of an adequately strong and rigid connection. Many such means are well known in the art, including, for example, rivets screws, welds and adhesives.

The shape and orientation of the lower rib connecting element 412 and engagement hook 416 are configured so as to receive the engagement pin 418 when the door in moved into the closed position, and, while the door is in the closed position, to transfer in-plane hoop stress between the door 402 and the rib 106 of the fuselage 400.

FIG. 5C is an end view of the lower engagement assembly 406, showing the relationship of the lower rib connecting element 412 and the lower door connecting element 414 while the door 402 is in the closed position. The door connector 424 closest to the viewer is omitted in FIG. 5C, for clarity. In the closed position, the engagement hook 416 engages the engagement pin 418, acting, first, as a stop, preventing movement of the engagement pin 418 any further in the outward direction. The lower engagement assembly 406 of FIG. 5C, in cooperation with the others of the pluralities of upper and lower engagement assemblies 404, 406, hold the door 402 in the closed position while a pressure difference continues to bias the door in the outward direction. Thus, the door 402 functions as a plug door, and transfers a radial stress component $S_R$ applied normal to the surface of the door, from the door to the surrounding air frame, via the ribs 106 above and below the door. But second, the engagement hook 416 acts to transfer in-plane hoop stress $S_H$ between the frame 106 and skin 104 below the door opening 403 and the door 402. In the same manner, the hoop stress $S_H$ is transferred between the door 402 and a frame 106 and the skin 104 above the door opening 403.

In the embodiment illustrated in FIGS. 5A-5C, the upper and lower rib connecting elements 408, 412 are coupled directly to the ribs of the fuselage 400. According to other embodiments, the elements are operatively coupled via intervening structures. For example, according to an embodiment, the fuselage 400 includes a door frame that extends around the perimeter of the door opening 403, which is coupled, directly or indirectly, to ribs of the fuselage 400 along the top and bottom of the door opening and to stringers of the fuselage along the sides of the door opening. The upper and lower rib connecting elements 408, 412 are coupled to and integrated with the door frame. Furthermore, according to an embodiment, the door 402 is provided with a door edge frame that extends around a perimeter of the door, and that incorporates the upper and lower door connecting elements 410, 414. An example of such an embodiment is described below with reference to FIG. 11.

One advantage provided by many embodiments, including those described with reference to FIGS. 5-5C, is the provision of a door that transfers stress loads, particularly hoops stresses. Another advantage is the automatic, passive security provided. It can be seen that when the door 402 is in the closed position, and assuming an airtight seal is formed between the door and the fuselage 400, the door cannot be opened without being moved inward, against the radial force applied to the door by the higher internal air pressure. Additionally, elements of the upper and lower engagement assemblies 404, 406 are entirely fixed and passive in their operation, meaning that they have no moving parts, and can securely engage the door independent of the operation of latching mechanisms, locks, or other mechanical closures. While the inventor envisions embodiments that include various mechanisms for opening and closing the door, and for securing the door while pressure is equalized, in-flight security of the door does not rely on any such mechanisms. Instead, if the door 402 is properly positioned in the door opening 403 and there is even a small positive pressure difference, the door is secure.

Furthermore, with regard to hoop stress loading, the fuselage 400 behaves like an uninterrupted cylinder while the door 402 is in the closed position $P_C$, eliminating a concentration of stress at the door frame, along with the requirement for the additional reinforcement.

Figure 6:
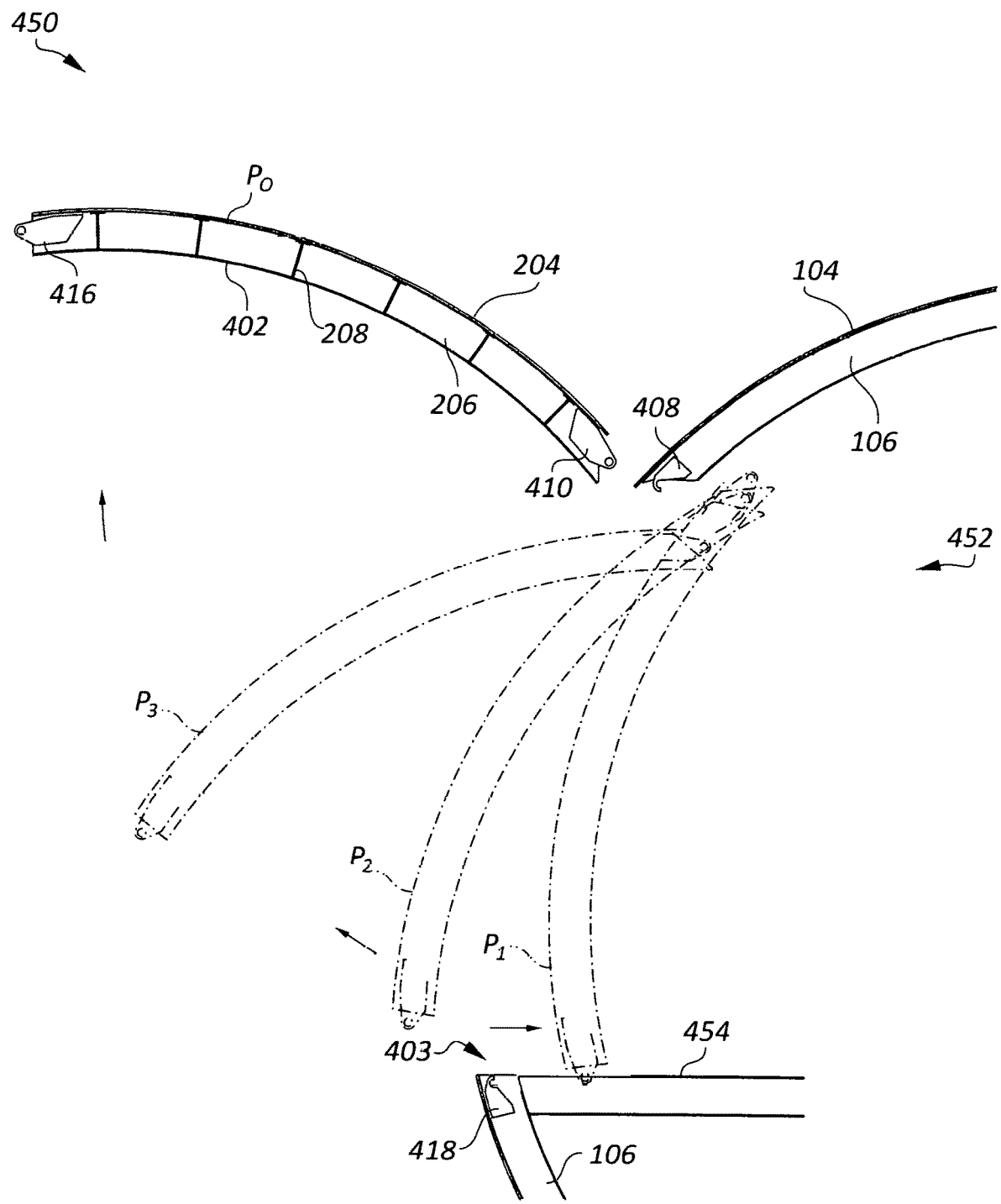
FIG. 6 is a diagrammatic end view of a portion of an airplane fuselage that includes a plug door assembly in which the door is configured to open outward, according to an embodiment.

FIG. 6 is a diagrammatic end view of a portion of an airplane fuselage 450 that includes a plug door assembly 452 in which a plug door 402 is configured to open outward, according to an embodiment.

The door assembly 452 includes the door 402 configured to operate as a plug door while closed, and as a canopy door when opened. The door 402 is shown in FIG. 6 in a fully open position $P_O$, extending outward so as to be clear of the door opening 403. Intermediate positions of the door during opening and closing are indicated in phantom lines. When moving from the closed position, described above with reference to FIGS. 5A and 5C, to the open position, the door is first moved inward to a first position $P_1$, to disengage the upper and lower engagement assemblies 404, 406. The door 402 is then rotated slightly around a horizontal axis and moved outward through the door opening 403. Rotation can be in either direction, depending upon the design of the opening mechanism. For example, the door can be rotated slightly clockwise, as viewed in FIG. 6, and lifted to permit the lower door connection elements 414 to clear the bottom of the door opening 403. The door 402 is then rotated outward around a horizontal axis just outside the top of the door opening 403, so that the bottom of the door passes through the opening first, as shown at the second position $P_2$. Rotation continues as the door passes through a third position $P_3$, and finally the door is lifted completely clear of the door opening 403 into the open position $P_O$. To close the door 402, the operation described above is simply reversed.

According to another embodiment, the door is initially rotated from the first position $P_1$ counter-clockwise, and lowered, so that the upper door connection elements 410 clear the top of the door opening 403. The door is then rotated outward with the top of the door passing through the door opening first.

FIG. 6 also shows a portion of a deck 454 extending inside the fuselage. If the deck is positioned flush with the bottom of the door opening 403, as shown, the deck can be provided with slots of sufficient width and length to accommodate the ends of the lower connection elements 416 as the door is moved into and out of the closed position. Alternatively, the deck can be positioned slightly below the bottom of the door opening 403 so that the lower connection elements 416 remain clear of the deck surface during opening and closing.

Figure 7:
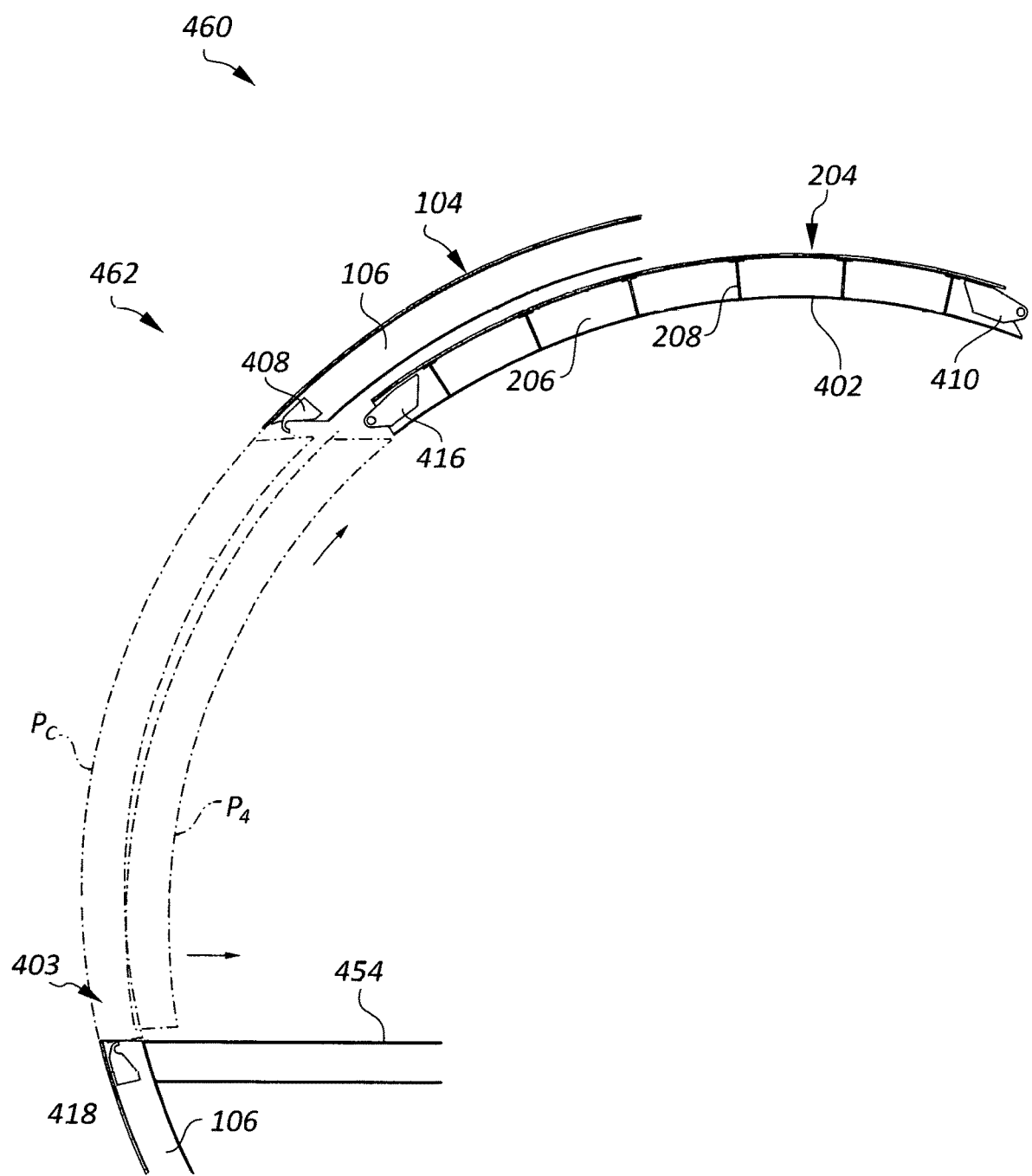
FIG. 7 is a diagrammatic end view of a portion of an airplane fuselage, according to an embodiment, that includes a plug door assembly in which the door is configured to open inward.

FIG. 7 is a diagrammatic end view of a portion of an airplane fuselage 460, according to an embodiment, that includes a plug door assembly 462 in which a door 402 is configured to open inward. From the closed position $P_C$, the door is moved inward to disengage the upper and lower engagement assemblies 404, 406 and simultaneously or subsequently rotated slightly forward to a first position $P_4$. The door 402 is then moved upward, closely following the inner curve of the fuselage 460, to the open position, as shown in FIG. 7, in which the bottom of the door is completely clear of the top of the door opening 403, and the door occupies a minimal amount of interior volume, but of more significance, does not occupy any deck space, so that the only deck space that is unavailable for cargo is just inside the door, and is not much deeper that the thickness of the door itself.

In another embodiment, the door is configured to drop downward through a slot in the deck and along the inner curve of the fuselage, to an open position below the door opening 403.

Various embodiments of the invention are well suited for use in cargo airplanes, because of the in-plane stress transfer characteristics referred to above. This is particularly the case in airplanes that are converted from passenger carriers, inasmuch as an airplane that is originally designed to carry passengers may not include the structural reinforcement that might be an integral aspect of an airplane designed as a cargo carrier. Principles disclosed herein may also be of utility in the design of passenger airplanes. Currently, many aircraft designers are contemplating the use of wider and/or taller doors in passenger airplanes, to permit more efficient—and safer—loading and offloading of passengers. As noted above, plug doors are preferred for use in passenger aircraft because they eliminate the danger that a passenger might open a door while in flight and because of the greater safety of the passive engagement mechanisms, but current plug door designs do not accommodate in-plane stress transfer. Instead, the door frames are reinforced to withstand the in-plane stresses. With a larger door, the door frame is subjected to increased stress loading, particularly with wider doors. The structural reinforcement necessary to accommodate the increased stresses adds expense to the manufacturer, but worse, adds weight to the aircraft that increases recurrent operating costs while reducing payload capacity. Many of the disclosed embodiments can help reduce or eliminate the cost penalties that come as a trade-off for improvements in loading efficiency and safety.

The embodiments described above with reference to FIGS. 4-7 provide plug doors that include engagement assemblies that are configured to transfer hoop stress in an airplane fuselage. Embodiments described hereafter with reference to FIGS. 8-10B provide plug doors that include engagement assemblies capable of transferring longitudinal in-plane and radial stress loads. Aspects of these embodiments are combinable with other disclosed embodiments to provide plug doors that can share stress loading around their entire perimeters, significantly reducing the weight and expense associated with the corresponding door frames.

Figure 8:
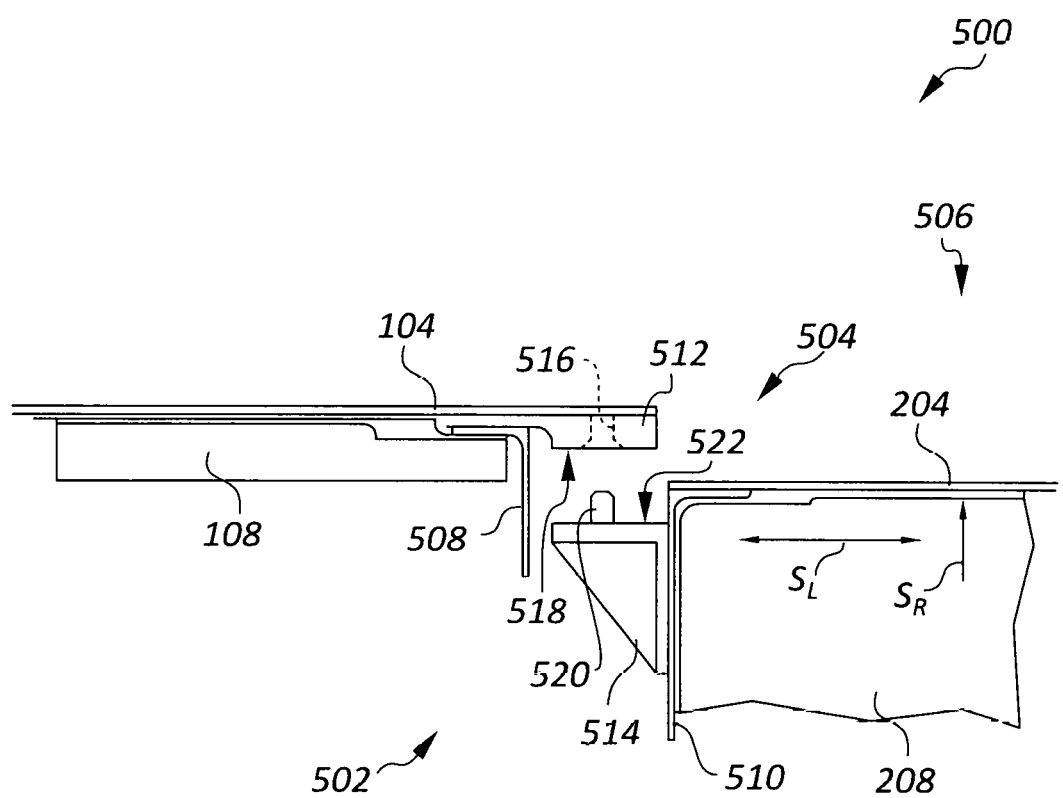
FIG. 8 is a top plan view of a portion of a door assembly of an airplane fuselage, according to an embodiment, including an engagement assembly configured to transfer in-plane stress.

FIG. 8 is a top plan view of a portion of a door assembly 500 of an airplane fuselage, according to an embodiment, configured to function as a plug door and to transfer in-plane stress. The door assembly 500 includes a plurality of pin-and-socket engagement assemblies 502, one of which is shown in FIG. 8. Details of the fuselage are not shown, but are similar in relevant aspects to other fuselages described herein. The door assembly 500 includes a door opening 504 and a door 506. A door frame 508 extends around a perimeter of the door opening 504, and is operatively coupled to fuselage frame members that surround the door opening, including stringers 108, and to the skin 104 of the fuselage. A door edge frame 510 extends around a perimeter of the door 506, and is operatively coupled to door frame members, including door stringers 208, and to the skin 204 of the door.

The engagement assembly 500 includes a frame connecting element 512 operatively coupled to the stringer 108, the door frame 508 and the skin 104. The engagement assembly 500 further includes a door connecting element 514 operatively coupled to the door stringer 208, the door edge frame 510 and the door skin 204. The frame connecting element 512 includes an engagement socket 516 and a contact surface 518, while the door connecting element 514 includes an engagement pin 520 and a contact surface 522. While the door 506 is in the closed position, the contact surfaces 518, 522 of the frame connecting element 512 and the door connecting element 514, respectively, are configured to bear against each other and function as stops, preventing outward movement of the door 506, relative to the door frame 508, beyond the closed position, in response to radial stress loading $S_R$. Meanwhile the engagement socket 516 is configured to receive the engagement pin 520, acting to transfer longitudinal stress SL between the door 506 and the fuselage.

Figure 9A:
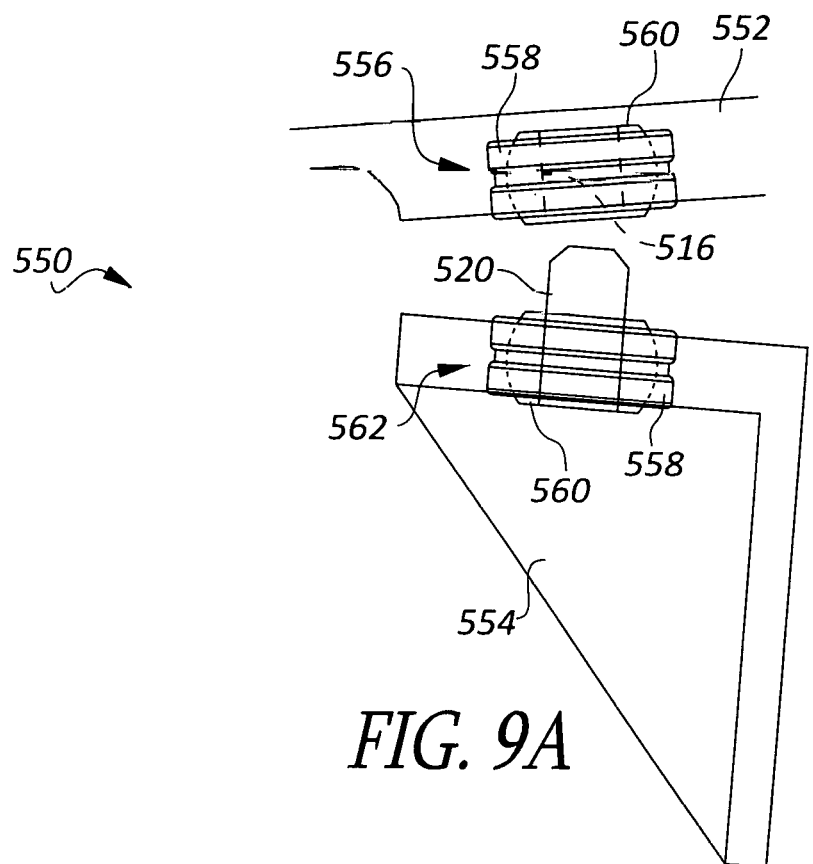
FIGS. 9A and 9B are top plan views of an engagement assembly, according to an embodiment, configured to accommodate an angular mismatch between an airplane door and door frame.
Figure 9B:
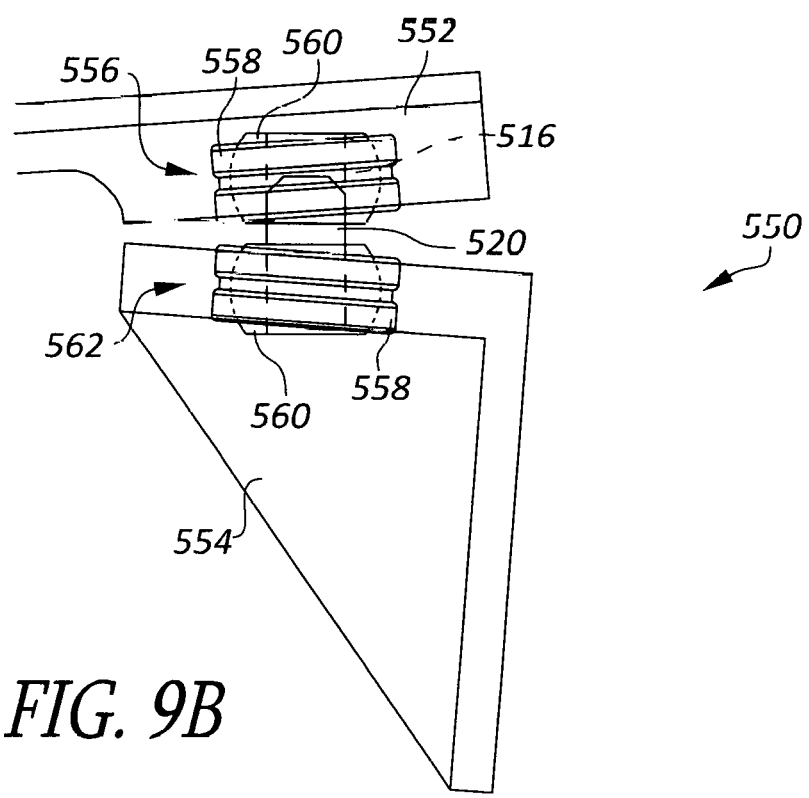

FIGS. 9A and 9B are top plan views of an engagement assembly 550, according to an embodiment. FIG. 9A shows the engagement assembly 550 in a condition in which a door assembly to which it is coupled is in a partially open position, while FIG. 9B shows the engagement assembly in a condition in which the door assembly has moved toward a closed position.

The engagement assembly 550 is similar in many respects to the engagement assembly 504 described with reference to FIG. 8, and includes a frame connecting element 552 configured to be operatively coupled to elements of a fuselage, including a door frame, and a door connecting element 554, configured to be operatively coupled to elements of a door, as previously described. The frame connecting element 552 comprises a spherical bushing 556 that includes an outer ring 558 rigidly coupled to a body of the frame connecting element. An inner ring 560 has a semi-spherical shape and is configured to rotate about thee axes within the outer ring. A bore extending through the inner ring forms an engagement socket 516 of the frame connecting element 552. Similarly, the door connecting element 554 comprises a spherical bushing 562 that includes an outer ring 558 and a semi-spherical inner ring 560. A bore through the inner ring holds a connecting pin 520 configured to be received in the engagement socket 516 of the frame connecting element 552.

The spherical bushings 556, 562 of the frame and door connecting elements 552, 554 are configured to accommodate a slight angular mismatch between a door and a door frame as the door is moving toward a closing position. In FIG. 9A, a door to which the door connecting element 904 is notionally coupled is positioned at a slight angle, relative to the corresponding frame connecting element 552, notionally coupled to an aircraft door frame. It can be seen that the engagement pin 520 is not properly aligned with the engagement socket 516. However, as the door connecting element 554 is brought closer to the frame connecting element 552, and the engagement pin 520 begins to engage the engagement socket 516, the inner rings 560 of the spherical bushings 558, 562, rotate and orient themselves so as to bring the engagement pin and engagement socket into a correct alignment, and illustrated in FIG. 9B. This permits the frame and door connecting elements 552, 554 to make a positive connection. From this point, the door can rotate around the connection into a proper orientation with the door frame, allowing other engagement assemblies positioned around the door frame to engage as the door moves into the closed position.

Figure 10A:
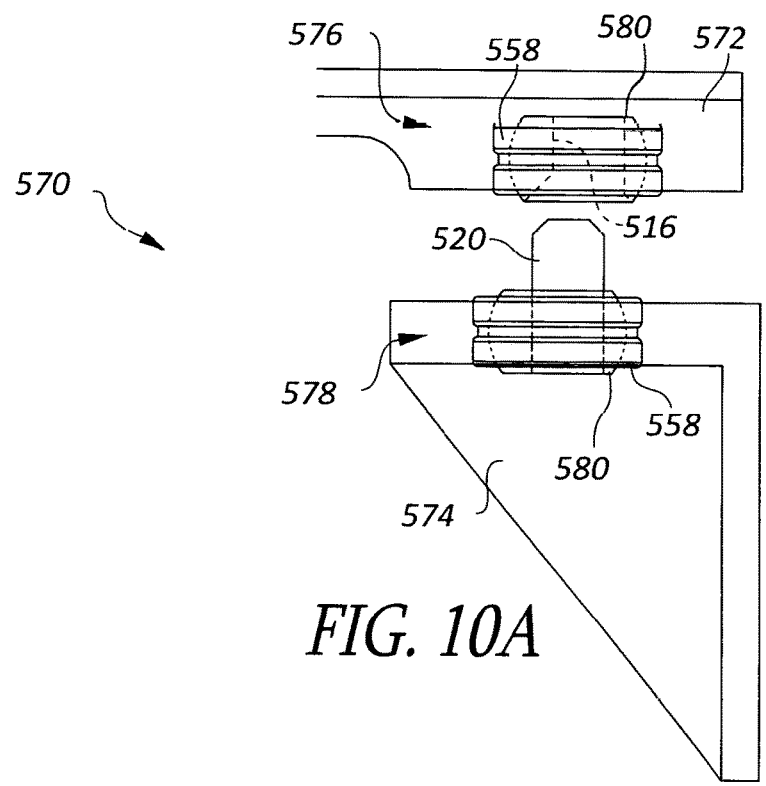
FIGS. 10A and 10B are top plan views of an engagement assembly, according to an embodiment, configured to accommodate a misalignment of an airplane door with the door frame.
Figure 10B:
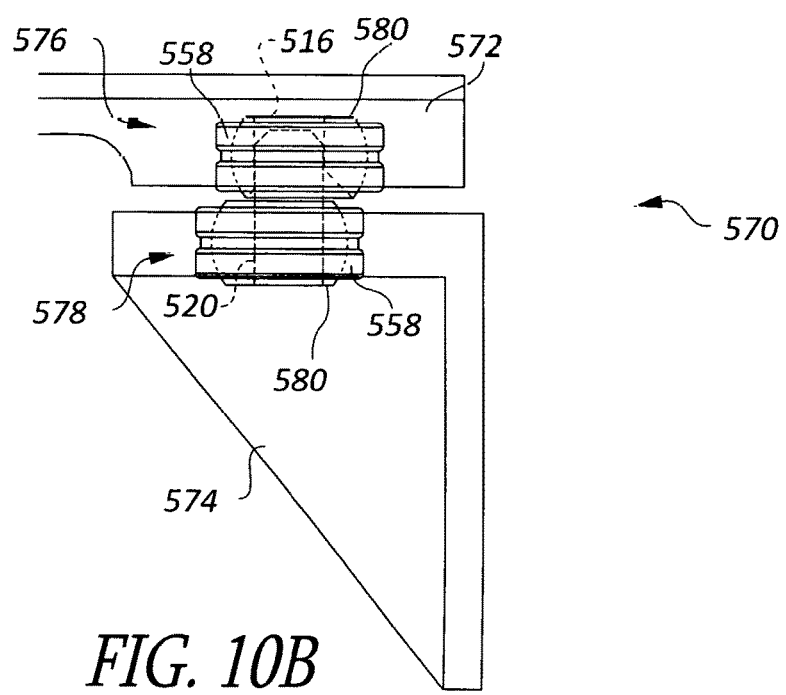

FIGS. 10A and 10B are top plan views of an engagement assembly 570, according to an embodiment. FIG. 10A shows the engagement assembly 570 in a condition in which a door assembly to which it is coupled is in a partially open position, while FIG. 10B shows the engagement assembly in a condition in which the door assembly has moved toward a closed position.

The engagement assembly 570 is similar in most respects to the engagement assembly 550 described with reference to FIG. 9, and includes a frame connecting element 572 and a door connecting element 574. The frame and door connecting elements 572, 574 comprise respective spherical bushings 576, 578 that include outer rings 558 and semi-spherical inner rings 580. The spherical bushing 576 includes an engagement socket 516 while the spherical bushing 578 includes an engagement pin 520. An important difference between the spherical bushings 556, 562 of FIGS. 9A, 9B and the spherical bushings 576, 578 of FIGS. 10A, 10B is that in the latter bushings, the engagement socket 516 and the engagement pin 520 are off center in the inner rings 580. This permits them to accommodate a slight misalignment of an aircraft door assembly in which they are positioned.

In FIG. 10A, the frame and door connecting elements 576, 578 are slightly misaligned, laterally. As the connecting elements are brought closer together and the engagement socket 516 and engagement pin 520 make contact, the inner rings 580 of the spherical bushings 576, 578 rotate relative to each other until the engagement pin 520 is aligned with the engagement socket 516, at which point the engagement pin can move into engagement with the engagement socket. Simultaneously, other engagement assemblies mounted around the door can similarly engage, permitting the door to move to a fully closed position, even if it is slightly out of alignment.

Aircraft doors typically employ complex hinge mechanisms to enable them to move between open and closed positions. Because of the complexity of these mechanisms, they frequently require careful adjustment to enable proper operation, and are prone to coming out of adjustment. The embodiments disclosed with reference to FIGS. 9A-10C include features that enable aircraft doors to operate within broader tolerances, reducing maintenance requirements.

Figure 11:
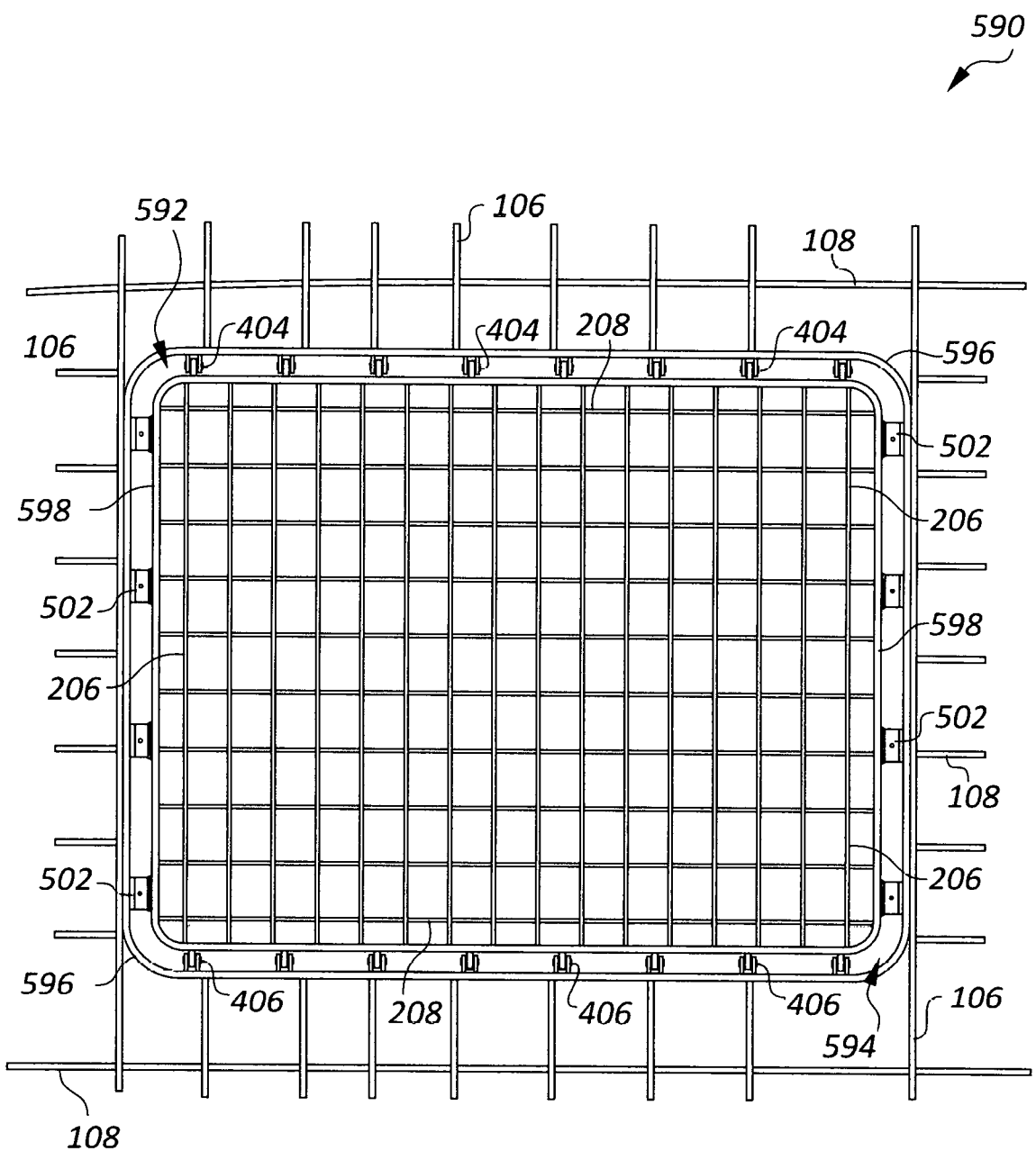
FIG. 11 is a side elevation view of a portion of an airplane fuselage, and particularly of a door assembly, according to an embodiment, configured to transfer in-plane stress vertically and horizontally between a door and the fuselage.

FIG. 11 is a side elevation view of a portion of an airplane fuselage, and particularly of a door assembly 590, according to an embodiment. The door assembly 590 includes a plurality of ribs 106 and stringers 108 coupled to a skin, which is not shown in FIG. 11. The door assembly 590 further includes a door 592 positioned within a door opening 594. A door frame 596 extends around a perimeter of the door opening 594, and is operatively coupled to fuselage frame members that surround the door opening, including ones of the pluralities of ribs 106 and stringers 108, and to the skin of the fuselage. A door edge frame 598 extends around a perimeter of the door 592, and is operatively coupled to door frame members, including door ribs 206 and door stringers 208, and to the skin of the door, which is also not show here.

A plurality of upper and lower engagement elements 404, 406 are mounted along, respectively, the upper and lower edges of the door 592, between the door frame 596 and the door edge frame 598. Likewise, pluralities of engagement assemblies 502 are mounted along vertical edges of the door 592 between the door frame 596 and the door edge frame 598. Each of the various pluralities of engagement assemblies includes a frame connecting element that is operatively coupled to the skin and structural members of the fuselage via the door frame, and a door connecting element operatively coupled to the skin and structural members of the door via the door edge frame 588.

The door 592 is shown in a closed position, in which the pluralities of engagement assemblies 404, 406, 502 are configured to transfer in-plane and radial stress between the door 592 and the fuselage. According to an embodiment, the door 592 is moved to an open position by first moving inward from the door opening 594 a distance sufficient to release the engagement of the pluralities of engagement assemblies 404, 406, 502. The door is then rotated around a horizontal axis a distance sufficient to clear the door from at the top and/or the bottom. The door 592 is then positioned vertically so that the door connecting elements of the engagement assemblies 502 along the vertical edges of the door are positioned to pass between the frame connecting elements along the vertical edges of the door frame 596, and the door is then translated or rotated out through the door opening 594 to a position that is clear of the door opening, similar to the process described with reference to FIG. 5. According to an alternative embodiment, once the door 592 has been moved out of engagement, it is raised to an open position along the curve of the fuselage, substantially as described with reference to FIG. 6.

FIG. 11 is provided to show an embodiment that includes engagement assemblies mounted along four sides of the aircraft door 592. FIG. 11 also shows an embodiment in which the engagement assemblies 404, 406, 502 are not directly coupled to frames or stringers, nor does their spacing correspond to that of the ribs and stringers. Instead, the engagement assemblies 404, 406, 502 are operatively coupled to the frames and stringers via intervening structures, and are evenly distributed along the respective edges of the door.

In the embodiment of FIG. 11, the upper and lower engagement assemblies 404, 406 are substantially similar to the upper and lower engagement assemblies 404, 406 described above with reference to FIGS. 5A-5C, and the engagement assemblies 502 are substantially similar to the engagement assemblies 502 described above with reference to FIG. 8. However, it is contemplated that elements of various embodiments can be combined to form additional embodiments, beyond those shown or described here.

Figure 12:
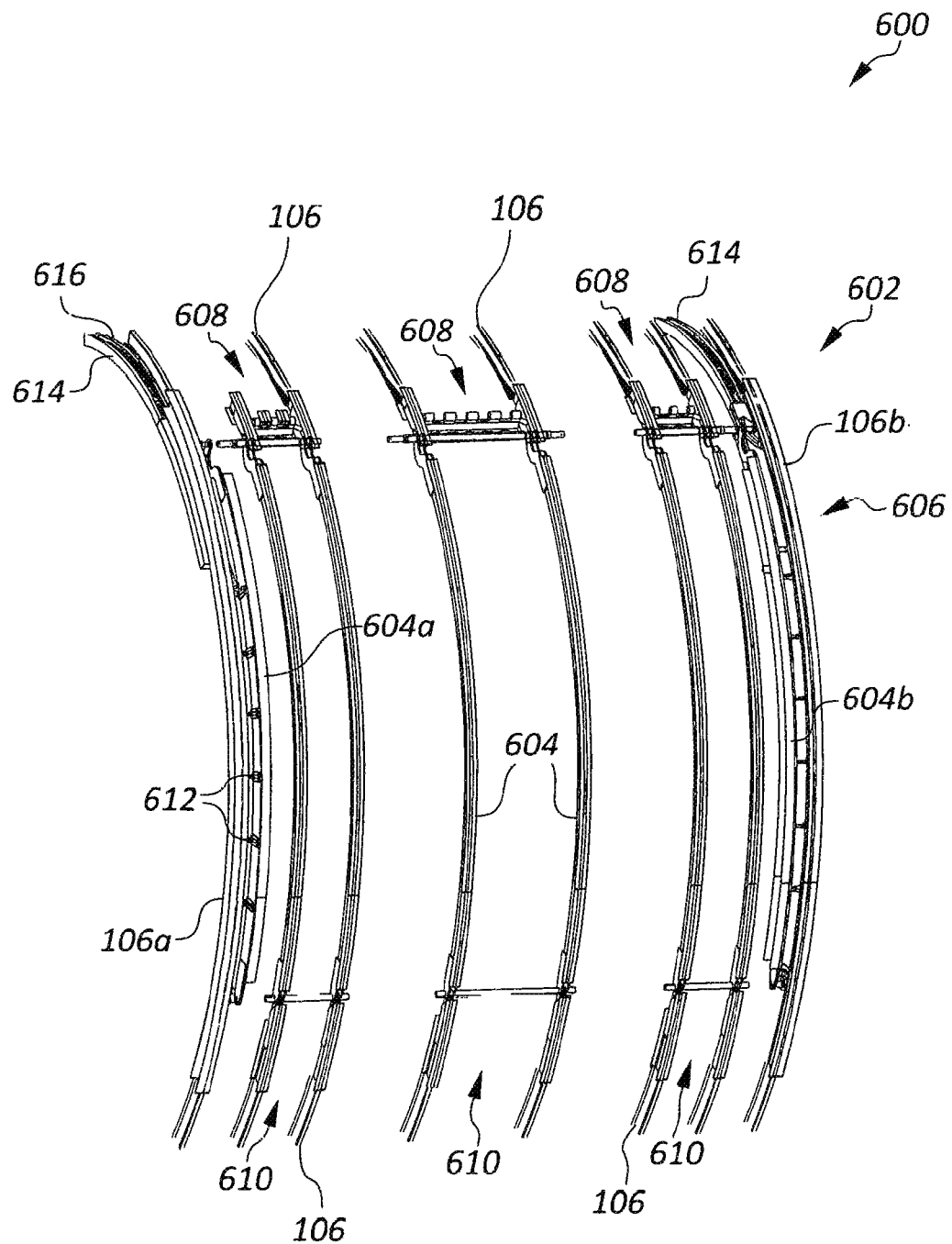
FIG. 12 is a perspective view of a portion of an airplane fuselage, according to an embodiment, and shows elements of a cargo door assembly, with fuselage and door skin omitted to show underlying details.

FIG. 12 is a perspective view of a portion of an airplane fuselage 600, according to an embodiment, and shows elements of a cargo door assembly 602, with fuselage and door skin omitted to show underlying details. The cargo door assembly includes door ribs 604, upper engagement assemblies 608 coupling the door to ribs 106 of the fuselage along the upper edge of the door assembly, lower engagement assemblies 610, configured to couple the door to frame elements of the fuselage along the lower edge of the door assembly, and vertical engagement assemblies 612 configured to couple the door to fuselage ribs 106a, 106b along both side edges of the door—door ribs that define the door edges are designated 604a and 604b in the drawings, and the corresponding fuselage ribs are designated 106a, 106b. The door assembly 600 further includes a pair of actuator tracks 614 coupled to respective fuselage ribs 106a, 106b on either side of and above the door 606. An actuator gear rack 616 is positioned in each of the actuator tracks 614.

Figure 13:
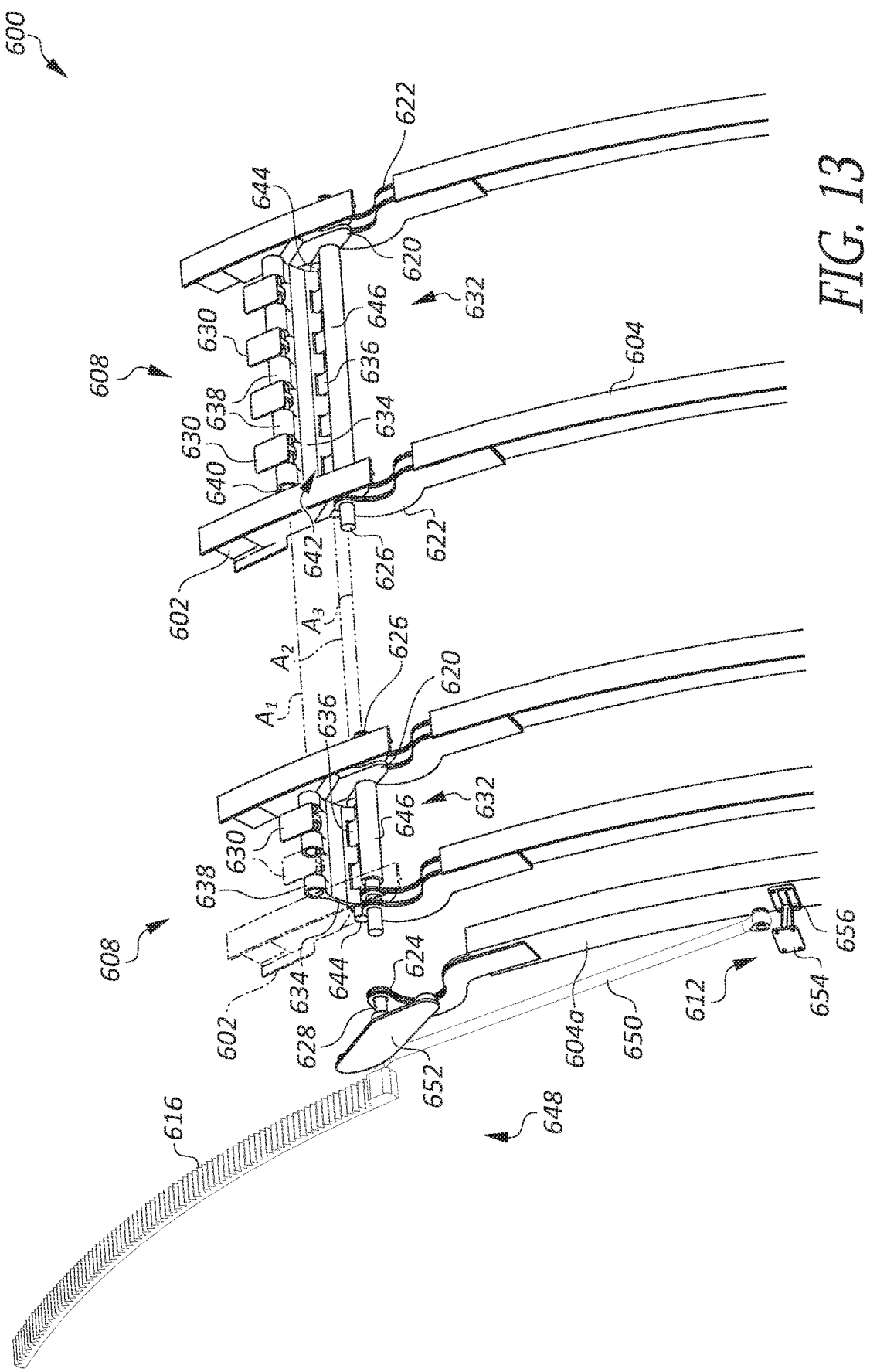
FIG. 13 is an enlarged detail view of a portion of the cargo door assembly of FIG. 12 showing, in particular, two upper engagement assemblies, according to an embodiment.

FIG. 13 is an enlarged detail view of a portion of the cargo door assembly 602 of FIG. 12 showing, in particular, two of the upper engagement assemblies 608, according to an embodiment. For clarity, some elements of the cargo door assembly 602 and upper engagement assemblies 608 are omitted, and other elements are shown in phantom lines.

The upper engagement assemblies 608 include upper engagement hooks 620 coupled to respective frame elements 106 of the fuselage, and upper engagement pin carriers 622 coupled to respective door ribs 604. An upper cam follower carrier 624 is coupled to the upper end of each of the first and last door ribs 604a, 604b, i.e., the ribs that define respective vertical edges of the door—only the first of which is shown in detail in FIG. 13. Engagement pins 626 extend between pairs of the upper engagement pin carriers 622, and a cam follower pin 628 is coupled to each of the upper cam follower carriers 624.

Pluralities of hinge carriers 630 are coupled to the skin of the fuselage between pairs of the upper engagement hooks 620. Each of the upper engagement assemblies 608 includes a multi-pin hinge 632 with first and second hinge leaves 634, 636 and three parallel axes of rotation. Outer knuckles 638 of the first hinge leaf 634 of each of the hinges 632 are coupled to one of the pluralities of hinge carriers 630 by a first hinge pin 640, such that the first hinge leaf is rotatable relative to the fuselage skin about a first axis of rotation $A_1$. Inner knuckles 642 of the first and second hinge leaves 634, 636 of each of the hinges 632 are coupled together by a second hinge pin 644 such that the first and second hinge leaves are rotatable relative to each other about a second axis of rotation $A_2$. A single outer knuckle, or barrel 646 of each of the second hinge leaves is coupled to a respective pair of the engagement pin carriers 622 by the corresponding engagement pin 626, such that the second hinge leaves are rotatable relative to the upper engagement pin carriers 622 about a third axis of rotation.

The door ribs 604 to which the upper engagement pin carriers 622 and the upper cam follower carriers 624 are affixed are each rigidly coupled to the skin of the door 606. Thus, the positions of the upper engagement pin carriers 622 and the upper cam follower carriers 624 are fixed, relative to each other. Likewise, the hinge carriers 630 are rigidly coupled to the skin of the fuselage, and are therefore positionally fixed, relative to each other. Furthermore, the elements of the upper engagement assemblies 608 are configured such that the first, second, and third axes of rotation $A_1$, $A_2$, $A_3$ of each of the upper engagement assemblies are substantially coaxial, respectively, i.e., the multi-pin hinges 632 of each of the upper engagement assemblies across the width of the door 606 share a common set of first, second, and third axes of rotation. The upper cam follower carriers 624 are also positioned and configured such that the cam follower pins 628 are coaxial with the engagement pins 626, and thus with the third axis of rotation.

Also shown in FIG. 13 are elements of one of two door lift assemblies 648, including one of the actuator gear racks 616, an actuator lift arm 650 coupled at a first end to the actuator gear rack 616 and at a second end to the first door rib 604a, and an upper cam plate 652 coupled to the corresponding fuselage rib 106a. The actuator gear racks 616 are configured to be driven by pinion gears so as to travel within the corresponding actuator track 614. Movement of the actuator gear racks drives the actuator lift arms 650, which in turn drives movement of the cargo door 606. The upper cam plate 652 includes an upper cam channel—described in more detail below with reference to FIG. 14. One end of the cam follower pin 628 extends into the upper cam channel such that the position of the door 606 is constrained by travel of the cam follower pin within the upper cam channel, during opening and closing operations of the door 606.

One of the vertical engagement assemblies 612 is shown in FIG. 13, including a rib connecting element 654 coupled to fuselage rib 106a, and a door connecting element 656 coupled to a the door rib 604a. According to an embodiment, the vertical engagement assembly 612 is configured to operate in a manner similar to other engagement assemblies described above, particularly any of those engagement assemblies 500, 540, 560 described for use along the vertical edges of a door.

According to an embodiment, latches are provided, such as, e.g., rotating cam-type latches, that are configured to engage one or both ends of the upper engagement pins 626 as they move into engagement with the upper engagement hooks 620, and to draw the engagement pins into full engagement with the engagement hook.

Figure 14A:
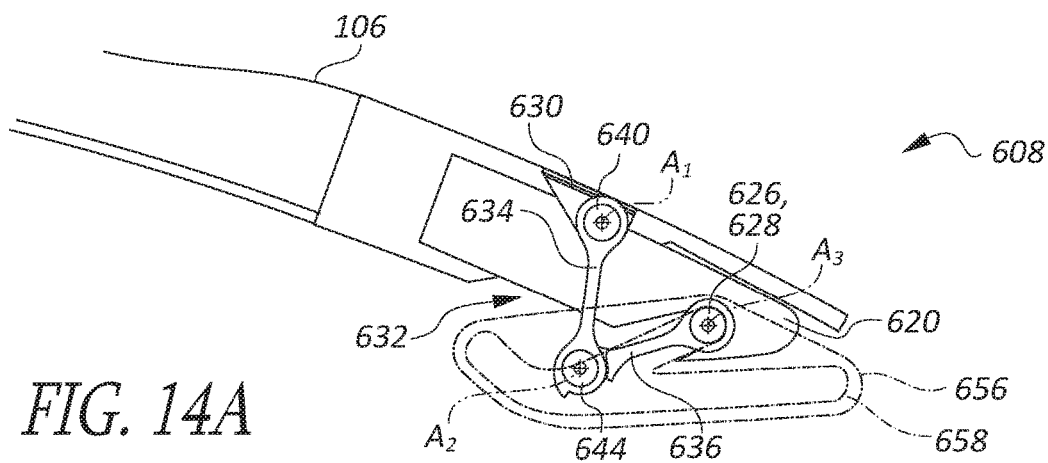
FIGS. 14A-14C are diagrammatic end views of a portion of an upper engagement assembly of FIG. 13, according to an embodiment, showing a multi-pin hinge in respective different positions relative to elements of the fuselage.
Figure 14B:
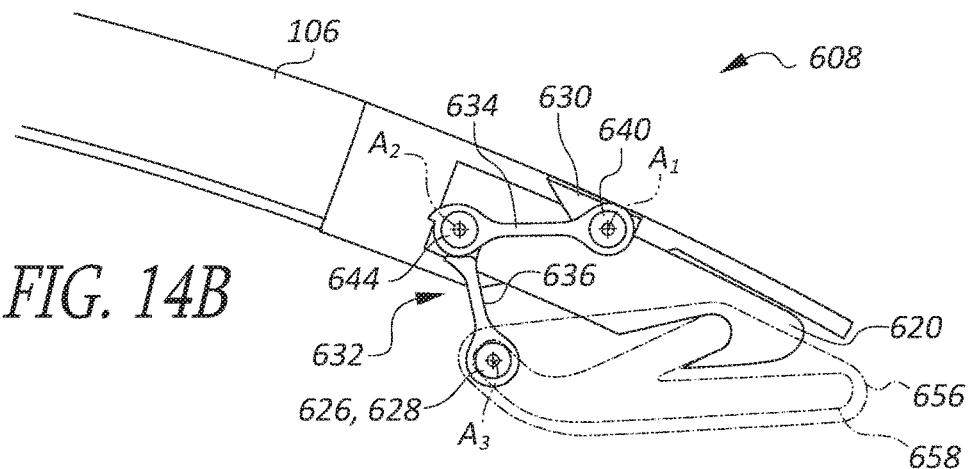
Figure 14C:
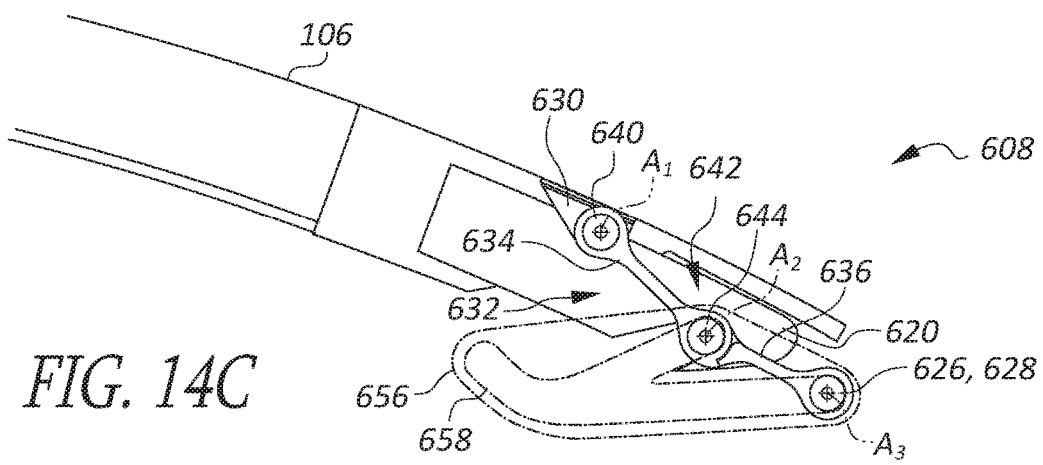

FIGS. 14A-14C are diagrammatic end views of a portion of an upper engagement assembly 608, according to an embodiment, showing movement of a multi-pin hinge 632 relative to a frame member 106 of the fuselage and to the upper cam plate 652. In addition to the hinge 632 and the upper cam plate 652, which is shown in phantom lines, an upper engagement hook 620 together with a portion of a frame member 106 are shown. The upper cam plate 652 includes an upper cam channel 658. While upper engagement pin carriers 622 and upper cam follower carriers 624 are omitted from FIGS. 14A-14C for clarity, it will be noted, referring to FIG. 13, that the engagement pins 626 and the cam follower pins 628 lie coaxial with the third axis of rotation $A_3$ of the hinge 632. One of the cam follower pins 628 travels within the upper cam channel 658 that is shown, while the other cam follower pin travels within an upper cam channel of an upper cam plate positioned on the opposite side of the door 606. Thus, during normal operation, when the cargo door 606 is opened or closed, the cam follower pins 628, together with the engagement pin carriers 622 and the rest of the cargo door, are constrained by the movement of the cam follower pins 628 within the upper cam channels 658 of the respective upper cam plates 652.

The multi-pin hinge 632 is movable between three stop positions defined by the "Y" shape of the upper cam channel 658, as shown respectively in FIGS. 14A-14C. In a first stop position, as shown in FIG. 14A, the cam follower pins 628 are at the ends of one of the arms of the upper cam channels 658 and the engagement pins 656 are received into the upper engagement hooks 620. This is also the hinge position shown in FIG. 13. In this position, with the engagement pins 656 received into the upper engagement hooks 620, the hinge 632 is functionally inactive. Any outward force on the door 606 will be transferred to the frame members 106 of the fuselage via the engagement pins and the upper engagement hooks 620. This is the position of the upper engagement assemblies 608 while the door 606 is closed.

From the first stop position, the cam follower pins 628 travel past the lowest point of the upper cam channel 658 to the second stop position, at the end of the tail of the upper cam channel, as shown in FIG. 14B. This movement first pulls the upper part of the door 606 away from the door opening, and then lifts the door. As will be seen later, this movement begins disengaging the lower part of the door from the door opening.

From the second stop position, the cam follower pins 628 travel back down the tail and out to the end of the other arm of the upper cam channel 658, as shown in FIG. 14C. This movement pushes the upper part of the door 606 out toward the opening. With the first engagement assemblies in the position shown in FIG. 14C, the door can be swung outward to its fully open position. When the hinges 632 move into the position shown, the ends of the second hinge pins 644, which extend some distance beyond either side of the hinges 632, engage the hooks 620, which locks out the first leaves 634 of the hinges 632. Additionally, in this position the door 606 is again supported by the upper engagement hooks 620, via the second hinge leaves 636. The multiple hinges 632 across the width of the door 606 impart significant stiffness to the door 606, particularly while the hinges are in the third stop position, with each of the engagement pins 626 engaged by the upper engagement hooks 620. This is beneficial, especially when the airplane is subjected to strong winds while the door is cantilevered in the open position.

According to an embodiment, rotation stops are coupled to the inside of the skin just beyond the upper engagement hooks 620 and are configured to prevent the second hinge leaves 636 from swinging outward so far as to contact the airplane skin from below, and possibly damage the skin and/or the hinges. According to another embodiment, the inner knuckles 642 of the first and second hinge leaves 634, 636 are configured to cooperate with each other to limit their relative rotation about the second axis of rotation $A_2$ beyond the point shown in FIG. 14C, to prevent the hinge 632 from folding backwards on itself, such as when the door is moving away from the open position.

Figure 15:
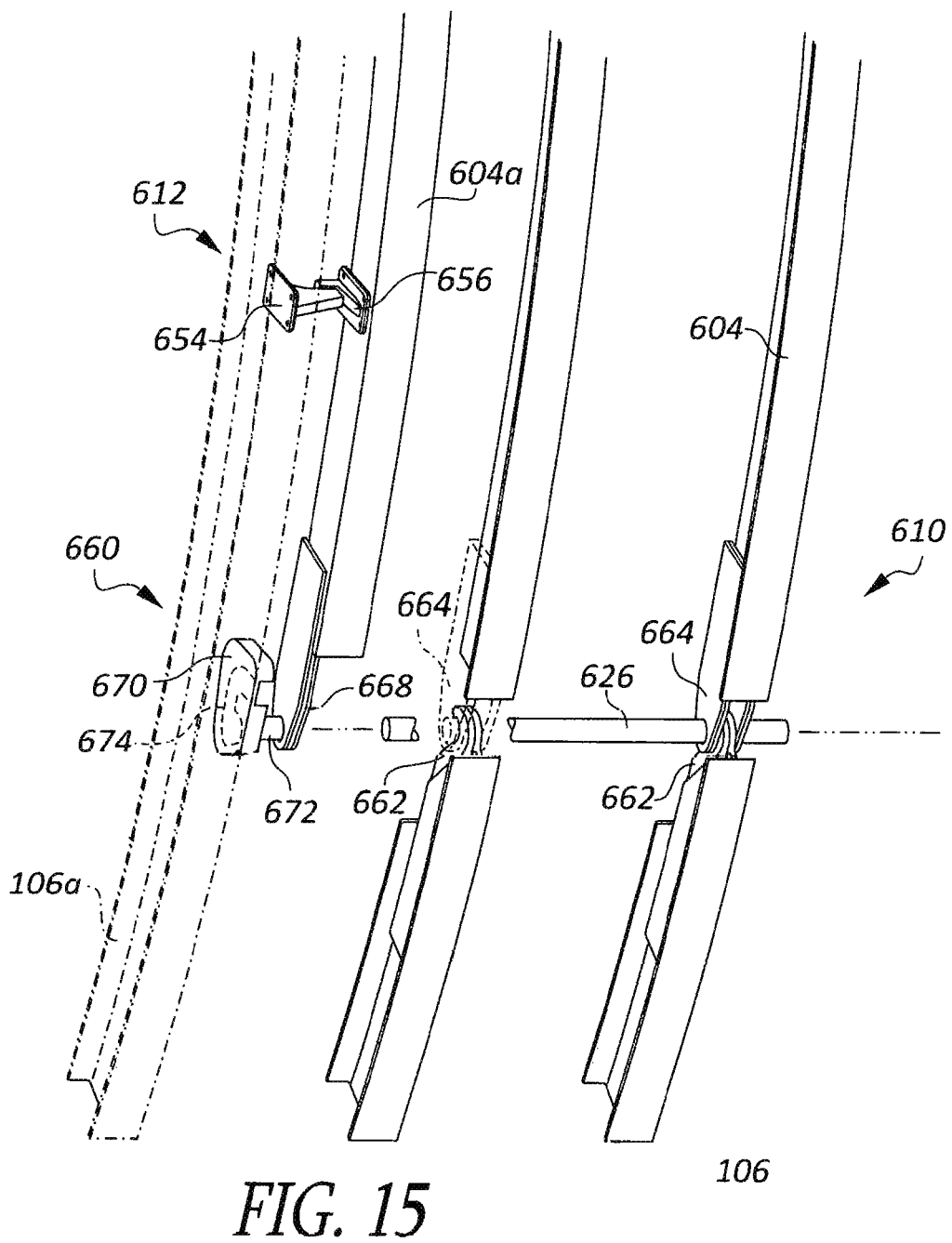
FIG. 15 is an enlarged detail view of a portion of the cargo door assembly of FIG. 12 showing, in particular, elements of a lower engagement assembly and a door locking guide assembly, according to an embodiment.

FIG. 15 is an enlarged detail view of a portion of the cargo door assembly 602 of FIG. 12 showing, in particular, elements of one of the lower engagement assemblies 610 and a door locking guide assembly 660, according to an embodiment. The lower engagement assembly 610 includes a pair of lower engagement hooks 662, coupled to respective fuselage ribs 106, a pair of lower engagement pin carriers 664 (one of which is shown in phantom lines) coupled to respective door ribs 604, and a lower engagement pin 666 extending between the pair of lower engagement pin carriers 664. Each of the lower engagement pin carriers 664 is configured to straddle a respective one of the lower engagement hooks 662, with the hooks engaging the lower engagement pin 666.

The door locking guide assembly 660 is one of two door locking guide assemblies, the other being at the opposite lower corner of the door 606. The door locking guide assembly 660 includes a lower cam pin carrier 668 coupled to the first door rib 604a, a locking plate 670 coupled to the corresponding fuselage rib 106a, shown in phantom lines, and a locking pin 672. The locking plate 670 has a lower cam channel 674 on a side facing the door 606, and shown in FIG. 15 in hidden lines. The lower engagement pin carriers 664 and the lower cam pin carrier 668 are configured such that each of the lower engagement pins 666 and each of the locking pins 672 lie in a common locking axis $A_L$. Similarly, the lower engagement hooks 662 and lower cam plate 670 are coupled to respective fuselage ribs 106 and to the fuselage skin, and so are positionally fixed, relative to each other. Accordingly, movement of the lower edge of the door 606, relative to the fuselage and door opening, is constrained by movement of the locking pin 672 in the lower cam channel 674.

Figure 16A:
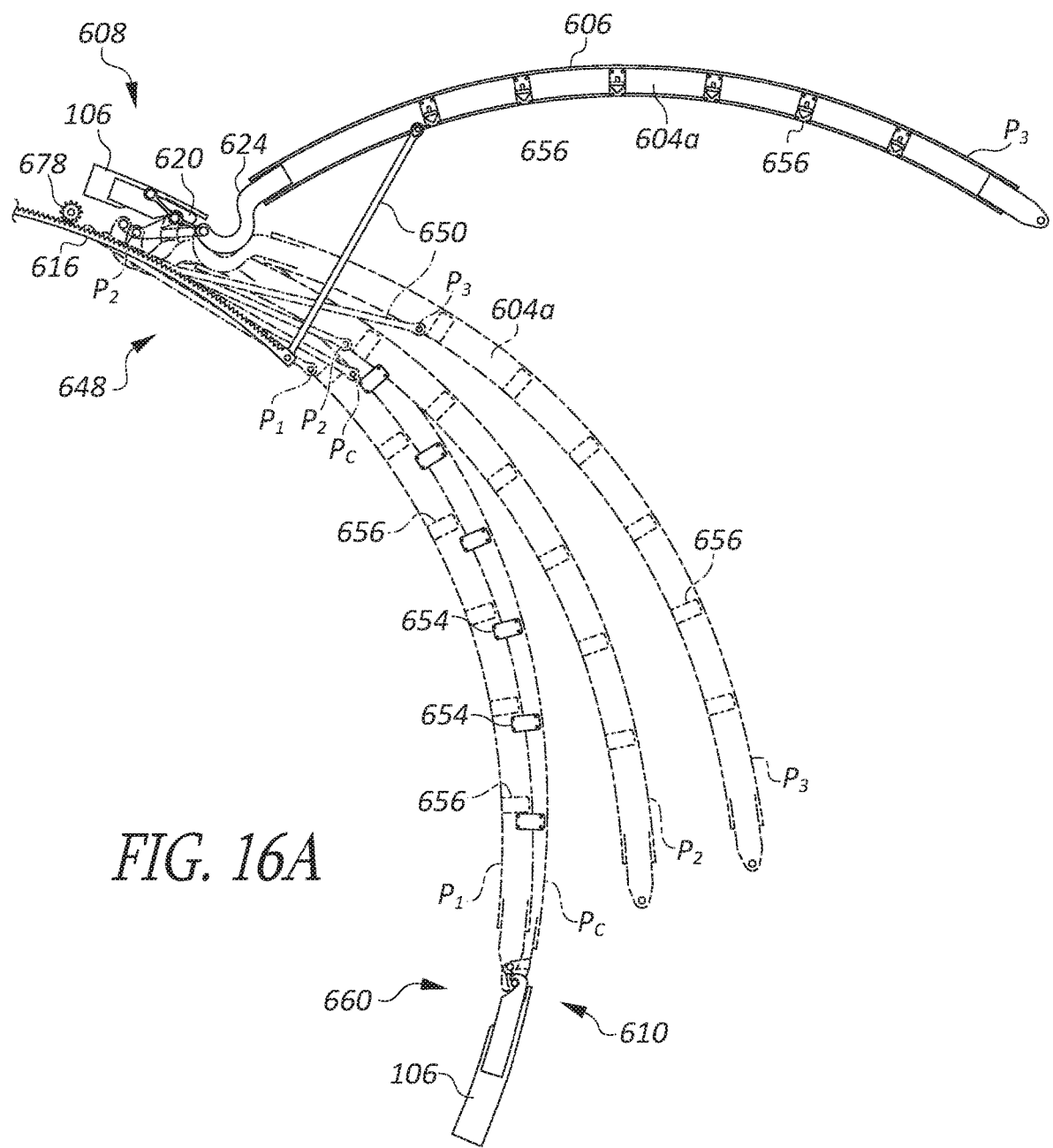
FIG. 16A is a diagrammatic end view of elements of the airplane fuselage of FIGS. 12-15, according to an embodiment, that includes a plug door assembly in which the door is configured to open outward, as a canopy door.

FIG. 16A is a diagrammatic end view of elements of the airplane fuselage 600 of FIGS. 12-15, according to an embodiment, that includes a plug door assembly 608 in which the door 606 is configured to open outward, as a canopy door. Features shown include elements of upper, lower, and vertical engagement assemblies 608, 610, 612, a door lift assembly 648, the cargo door 606 and the fuselage 600. The door 606 is shown in the open position $P_O$, and, in phantom lines, in the closed position $P_C$ and in a series of intermediate positions $P_1$-$P_3$ between the open and closed positions. Corresponding positions are also indicated for the second end of the actuator lift arm 650, where the arm is coupled to the first door rib 604a, and from which movement of the actuator rack gear 616 can be inferred. Movement of the actuator rack gear 616 is driven by an actuator pinion gear 676, which can be powered by any appropriate actuator, such as, e.g., an electric or hydraulic rotary actuator, etc.

Figure 16B:
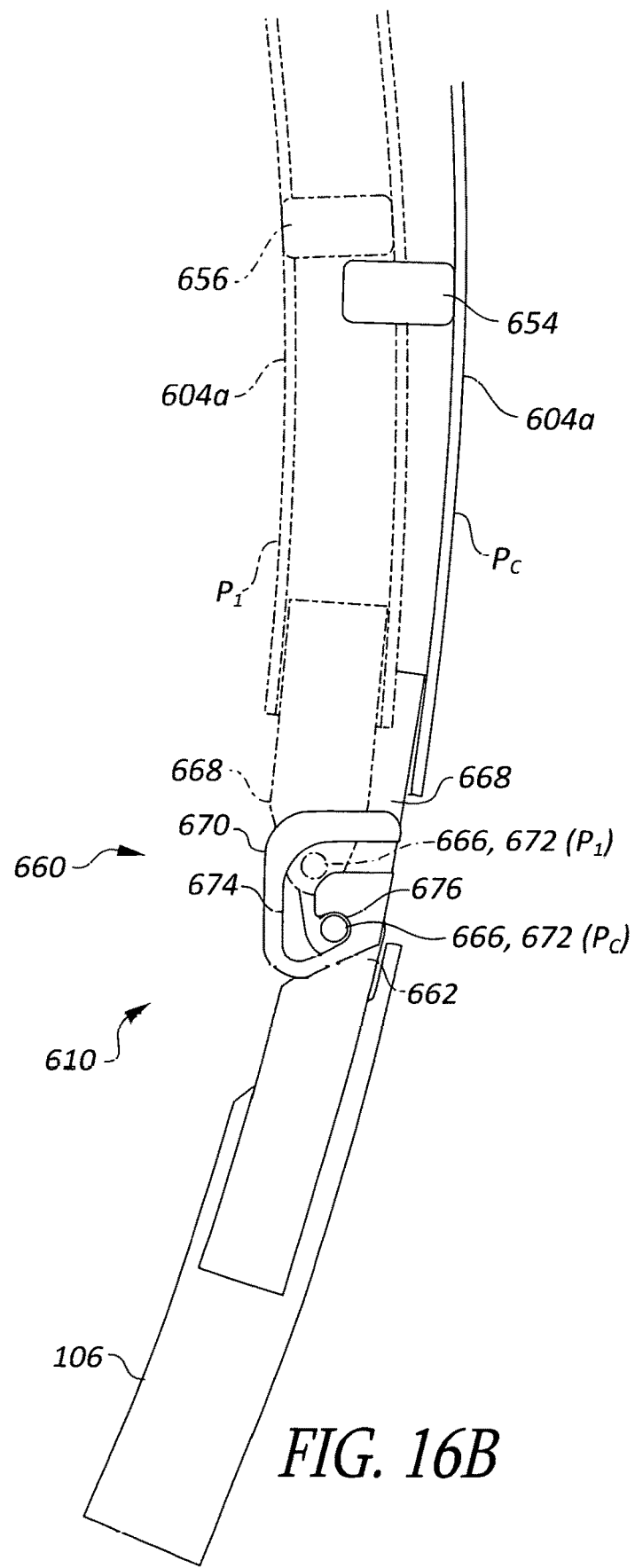
FIG. 16B is an enlarged view of a portion of the plug door assembly of FIG. 16A, showing details of a lower engagement assembly, a lower locking guide assembly, and adjacent structure.

FIG. 16B is an enlarged view of a portion of FIG. 16A, showing details of the lower engagement assembly 610, lower locking guide assembly 660, and adjacent structure. In FIG. 16B, the door 606 is shown in only two of the positions described with reference to FIG. 16A: the closed position $P_C$, and the first intermediate position $P_1$. Accordingly, the door 606 is shown in solid lines in the closed position $P_C$ and in phantom lines in the first intermediate position $P_1$. The back of the lower cam plate 670 is rendered transparent, to show the positions of the lower engagement pins 666 and locking pin 672 in relation to the cam channel 674 as the door 606 moves away from the closed position. As noted above, the lower engagement pins 666 and the locking pin 672 are fixed to a common locking axis $A_L$, and so, in the end view of FIG. 16B, they are superimposed. Meanwhile, the lower engagement hooks 662 and the lower cam plate 670 are also fixed in relation to each other. As viewed in FIG. 16B, the lower engagement hooks 662 are aligned with a locking notch 676 of the lower cam channel 674. Thus, when the locking pin 672 is guided into the locking notch 676 of the lower cam channel 674, each of the lower engagement pins 666 is guided into engagement with the corresponding lower engagement hooks 662.

Operation of the cargo door 606 as it moves between the closed position $P_C$ and open position $P_O$ will be described hereafter, with reference to FIGS. 14A-C, 16A and 16B—movement of the door from the open position $P_O$ to the closed position $P_C$ requires merely a reversal of the process described below.

With the door 606 in the closed position $P_C$, the hinges 632, upper engagement pins 626, and cam follower pins 628 are in the positions shown in FIG. 14A, with the upper engagement pins engaged by the upper engagement hooks 620; the lower engagement pins 666 and locking pins 672 are in the positions shown in FIG. 16B, with the locking pins in the locking notch 676 of the lower cam channels 674 and the lower engagement pins 666 engaged by the lower engagement hooks 662; and each of the rib connecting elements 654 of the vertical engagement assemblies 612 is positioned to engage a corresponding door connecting element 656, as shown, for example, in FIG. 15. In this position and configuration, with a positive pressure inside the fuselage, the door is secured in place entirely by passive, multiply redundant structural elements, and can only be opened by an initial inward movement of the door. Additionally, hoop stress and radial stress are transferred from the door 606 to the surrounding air frame, and, depending upon the particular design of the vertical engagement assemblies 612, so too may be the longitudinal stresses.

To prevent movement of the door while the internal and external pressures are equal, as when the airplane is on the ground, a simple draw latch (not shown) can be provided just below the cargo door 606, configured to capture one or more of the lower engagement pins 666 or locking pins 672 and draw them into engagement with the lower engagement hooks 662 and/or the locking notch 676 of the lower cam channels 674. While the lower part of the door is held in this position, the upper part cannot move, inasmuch as an inward movement is required, and, given the shape of the upper cam channels 658, such a movement is prevented while the locking pins 672 are at the locking notch 676 of the lower cam channel 674.

To initiate the opening procedure, the door 606 is pivoted inward on the upper engagement pins very slightly, so that the locking pins 672 are moved out of the locking notches 676 in the lower cam channels 674. The actuator pinion gear 676 is then powered to move the actuator rack gear 616 upward a short distance, thereby pulling the actuator lift arm 650 and the door 606 upward, as well, to the first position $P_1$ shown in FIG. 16A. Corresponding movement of the cam follower pins 628 in the upper cam channels 658 to the position shown in FIG. 14B guides the upper engagement pins 626 out of engagement with the upper engagement hooks 620 and moves the upper part of the door inward, so that as the door moves upward, it clears the top of the door opening. As the door moves upward, the locking pins 672 are moved to the location corresponding to the first position $P_1$ shown in FIG. 16B, so that they can move out of the lower cam channels as the door continues to open. This movement also draws the door connecting elements 656 out of engagement with the frame connecting elements 654, as shown in FIGS. 16A and 16B.

Once the door reaches the first position P1, the pinion gear 678 reverses rotation and begins to drive the actuator rack gear 616 downward. The cam follower pin 628, following the upper cam channel 658, moves or is driven to the bottom of the channel and then outward. Movement of the cam follower pin 658 and the actuator rack gear 616 are coordinated so that when the cam follower pin 658 reaches the lowest point of the upper cam channel, the cargo door 606 is at the second intermediate position P2 shown in FIG. 16A. This moves the locking pin 672 out of the lower cam channel 674 and moves the door connecting elements 656 clear of the frame connecting elements 654. The actuator rack 616 continues downward, moving the door mostly forward, or outward, until the cam follower pins 628 reach the position shown in FIG. 14C, which corresponds to the third position $P_3$ of FIG. 16A. At this point, the second hinge pins 644 are engaged by the upper engagement hooks 620, which stabilizes and stiffens the door 606, and all further movement of the door will be rotational movement, around the upper engagement pins 626 and the third axis of rotation $A_3$.

The actuator rack gear 616 continues to power the door until it reaches the open position $P_O$. Shortly before driving the door 606 to the fully open position, the actuator lift arm 650 crosses "over center." This means that, while in the open position $P_O$, gravity acting on the door 606 will tend to bias the actuator rack gear 616 further downward, rather than back upward. Provided the door lift assembly 648 includes a mechanical stop to prevent the actuator rack gear 616 from moving beyond the open position, the door will remain in the open position without the need of a brake on the rotary actuator powering the actuator pinion gear 678.

The abstract of the present disclosure is provided as a brief outline of some of the principles of the invention according to one embodiment, and is not intended as a complete or definitive description of any embodiment thereof, nor should it be relied upon to define terms used in the specification or claims. The abstract does not limit the scope of the claims.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A door assembly, comprising:
    a door configured to fit within a door opening in a fuselage of an airplane;
    a first plurality of engagement assemblies positioned and configured to releasably couple an upper edge of the door to a portion of an airframe of the fuselage adjacent the upper edge of the door and a lower edge of the door to a portion of the air frame adjacent the lower edge of the door, and further configured to transfer in-plane stresses between the door and the airframe, and to transfer radial stresses from the door to the airframe; and
    a second plurality of engagement assemblies positioned and configured to releasably couple substantially vertical edges of the door to respective adjacent portions of the airframe, and further configured to transfer radial stresses from the door to the airframe, where each of the second plurality of engagement assemblies includes a pin-and-socket connector assembly, configured to transfer in-plane stress between the door and the airframe and radial stress from the door to the airframe.

2. The door assembly of claim 1, comprising a door frame configured to be coupled to the airframe within the door opening and configured to receive the door therein, the first plurality of engagement assemblies being configured to releasably couple the upper and lower edges of the door to the airframe operatively, via the door frame.

3. The door assembly of claim 1, wherein each of the first plurality of engagement assemblies is configured to couple an edge of the door directly to a respective structural member of the airframe.

4. The door assembly of claim 1, wherein the door is configured to be opened with an initial inward motion.

5. The door assembly of claim 4, wherein, following the initial inward motion the door is configured to be opened outward.

6. The door assembly of claim 4, wherein the door is configured to be opened outward to a position substantially above the door opening.

7. The door assembly of claim 1, wherein the second plurality of engagement assemblies are further configured to transfer longitudinal in-plane stresses between the door and the airframe.

8. The door assembly of claim 1, wherein each of the pin-and-socket connector assemblies is configured to accommodate a misalignment of a pin and a socket of the pin-and-socket connector assembly during movement of the door toward a closed position.

9. The door assembly of claim 1, wherein each of the first plurality of engagement assemblies includes a hook-and-pin connector assembly configured to transfer in-plane stress between the door and the airframe and radial stress from the door to the airframe.

10. The door assembly of claim 9, wherein each of the hook-and-pin connector assemblies includes an engagement hook rigidly coupled to the airframe.

11. The door assembly of claim 10, wherein:
at least one of the first plurality of engagement assemblies includes a multi-pin hinge with three parallel axes of rotation;
outer knuckles of a first leaf of the multi-pin hinge are configured to be rotatably coupled to the airframe via a first pin;
inner knuckles of the first leaf and inner knuckles of a second leaf of the multi-pin hinge are rotatably coupled together via a second pin; and
outer knuckles of the second leaf are rotatably coupled to the upper edge of the door via a third pin.

12. The door assembly of claim 11, wherein:
the outer knuckles of the first leaf are configured to be rotatably coupled to the airframe via the first pin and a plurality of hinge carriers coupled to a skin of the airplane.

13. The door assembly of claim 11, wherein:
the multi-pin hinge is configured such that the first leaf is rotatable to a position in which an end of the second pin is received in the engagement hook; and
the multi-pin hinge is further configured such that the first leaves are rotatable to a position in which an end of the third pin is received in the engagement hook.

14. The door assembly of claim 11, wherein:
the one of the first plurality of engagement assemblies and a second one of the first plurality of engagement assemblies are positioned adjacent to respective opposite edges of the door; and
during movement of the door between a closed position and an open position, the door is configured to move inward a distance sufficient to disengage the hook-and-pin connector assemblies of the one of the first plurality of engagement assemblies and the second one of the first plurality of engagement assemblies, then to reposition sufficient to clear the lower edge of the door from the portion of the air frame adjacent the lower edge of the door, and then to rotate outward through the opening to a position substantially above the opening.

15. The door assembly of claim 10, wherein each of the hook-and-pin connector assemblies includes an engagement pin rigidly coupled to the door and configured to be engaged by the respective engagement hook while the door is in the closed position.

16. The door assembly of claim 15, comprising:
a cam channel configured to be rigidly coupled to the airframe;
a cam follower rigidly coupled to the door coaxially with engagement pins of the engagement assemblies positioned and configured to releasably couple the upper edge of the door to the airframe, the cam follower being positioned so as to extend into the cam channel;
an actuator mechanism configured to drive the door between the closed position and an open position, the cam follower being configured to cooperate with the actuator mechanism in controlling movement of the door between the open and closed positions.

17. The door assembly of claim 1, wherein the engagement assemblies of the first plurality of engagement assemblies are collectively configured to passively couple the door to the airframe while the door is positioned within the door opening and the airplane is pressurized.

18. A method, comprising:
transferring in-plane stresses across a plug door during flight of a pressurized airplane;
opening the plug door by moving the door inward a distance sufficient to disengage each of a plurality of engagement assemblies;
following the moving the door inward, clearing a door opening in a fuselage of the airplane by rotating the door about a horizontal axis; and
following the clearing the door opening, moving the door out through the door opening and rotating the door upward to a position substantially above the door opening.

19. The method of claim 18, wherein the step of moving the door inward comprises disengaging a plurality of hook-and-pin connector assemblies configured to releasably couple the door to an airframe of the airplane and to transfer in-plane stress between the door and the airframe.

20. The method of claim 18, wherein the step of moving the door inward comprises disengaging a plurality of pin-and-socket connector assemblies configured to releasably couple the door to an airframe of the airplane and to transfer in-plane stress between the door and the airframe.

21. A device, comprising:
a structure having an opening;
a door sized and configured to fit within the opening; and
a plurality of engagement assemblies positioned and configured to couple a first edge of the door to a corresponding edge of the opening, each of the plurality of engagement assemblies having:
an engagement hook rigidly coupled to the structure,
a multi-pin hinge with three parallel axes of rotation:
outer knuckles of a first leaf of the multi-pin hinge being rotatably coupled to the structure via a first pin,
inner knuckles of the first leaf and inner knuckles of a second leaf of the multi-pin hinge being rotatably coupled together via a second pin,
outer knuckles of the second leaf being rotatably coupled to the first edge of the door via a third pin, and wherein
the first leaf is rotatable to a position in which an end of the second pin is received in the engagement hook.

22. The device of claim 21, wherein:
the multi-pin hinge is further configured such that the first and second leaves are rotatable to respective positions in which an end of the third pin is received in the engagement hook.

23. The device of claim 22, wherein, while the end of the third pin is in the engagement hook, a passive coupling is established between the first edge of the door and the corresponding edge of the door opening.

24. The method of claim 18, wherein the step of opening the plug door comprises opening the plug door by moving the door inward a distance sufficient to disengage each of a plurality of passive engagement assemblies.

25. A system, comprising:
an airplane fuselage;
a door opening in the fuselage having horizontal edges extending substantially parallel to a longitudinal axis of the fuselage and vertical edges extending substantially perpendicular to the longitudinal axis;
a door sized and configured to be positioned in the door opening while in a closed position;
a first plurality of engagement assemblies positioned and configured to releasably couple a first vertical edge of the door to a corresponding first vertical edge of the opening; and a second plurality of engagement assemblies positioned and configured to releasably couple a second vertical edge of the door, opposite the first vertical edge of the door, to a corresponding second vertical edge of the opening, the first and second pluralities of engagement assemblies together configured to transfer longitudinal in-plane stresses between the door and the fuselage and to transfer radial stresses from the door to the fuselage, while the door is positioned in the door opening.

26. The system of claim 25, wherein the first and second pluralities of engagement assemblies are configured to passively couple the first and second vertical edges of the door to the first and second vertical edges of the door opening, respectively.

27. The system of claim 25, wherein the first and second pluralities of engagement assemblies are configured such that opening the door requires an initial inward movement of the door from the closed position, followed by an outward movement in which the door is moved to an open position outside of the fuselage.

28. The system of claim 25, wherein each of the engagement assemblies of the first and second pluralities of engagement assemblies comprises:

a socket rigidly fixed to one of the door and the fuselage adjacent to the door opening; and a pin rigidly mounted to the other of the door and the fuselage adjacent to the door opening, positioned so as to engage the socket while the door is in the closed position.

29. The system of claim 28, wherein the pin of at least one of the engagement assemblies of the first and second pluralities of engagement assemblies includes a pin mount that is rigidly mounted to the one of the door and the fuselage adjacent to the door opening, and a pin element coupled to the pin mount and capable of movement, sufficient to accommodate an angular misalignment of the door while the door is being moved into the closed position.

* * * * *